United States Patent [19]

Bauman et al.

[11] Patent Number: 5,603,005

[45] Date of Patent: Feb. 11, 1997

[54] CACHE COHERENCY SCHEME FOR XBAR STORAGE STRUCTURE WITH DELAYED INVALIDATES UNTIL ASSOCIATED WRITE REQUEST IS EXECUTED

[75] Inventors: Mitchell Bauman, Circle Pines; Michael Haupt, Roseville, both of Minn.

[73] Assignee: Unisys Corporation, Blue Bell, Pa.

[21] Appl. No.: 364,760

[22] Filed: Dec. 27, 1994

[51] Int. Cl.⁶ ................................................. G06F 13/00
[52] U.S. Cl. ........................ 395/451; 395/312; 395/471; 395/874; 364/DIG. 1
[58] Field of Search .......................... 395/312, 451, 395/471

[56] References Cited

U.S. PATENT DOCUMENTS

| | | | |
|---|---|---|---|
| 3,641,505 | 2/1972 | Artz et al. | 340/172.5 |
| 3,812,469 | 5/1974 | Hauck et al. | 340/172.5 |
| 3,872,447 | 3/1975 | Tessera et al. | 340/172.5 |
| 4,056,844 | 11/1977 | Izumi | 364/200 |
| 4,070,704 | 1/1978 | Calle et al. | 364/200 |
| 4,130,865 | 12/1978 | Heart et al. | 364/200 |
| 4,245,306 | 1/1981 | Besemer et al. | 364/200 |
| 4,349,871 | 9/1982 | Lary | 364/200 |
| 4,426,681 | 1/1984 | Bacot et al. | 364/200 |
| 4,437,157 | 3/1984 | Witalka et al. | 364/200 |
| 4,442,487 | 4/1984 | Fletcher et al. | 364/200 |
| 4,525,777 | 6/1985 | Webster et al. | 364/200 |
| 4,667,288 | 5/1987 | Keeley et al. | 364/200 |
| 4,755,930 | 7/1988 | Wilson, Jr. et al. | 364/200 |
| 4,761,755 | 8/1988 | Ardini, Jr. et al. | 364/749 |
| 4,794,521 | 12/1988 | Ziegler et al. | 364/200 |
| 4,807,110 | 2/1989 | Pomerene et al. | 364/200 |
| 4,807,183 | 2/1989 | Kung et al. | 395/312 |
| 4,843,541 | 6/1989 | Bean et al. | 364/200 |
| 4,843,542 | 6/1989 | Dashiell et al. | 364/200 |
| 4,860,192 | 8/1989 | Sachs et al. | 364/200 |
| 4,868,818 | 9/1989 | Madan et al. | 371/11.3 |
| 4,888,771 | 12/1989 | Benignus et al. | 371/16.1 |
| 4,891,810 | 1/1990 | deCorlieu et al. | 371/9.1 |
| 4,979,107 | 12/1990 | Advani et al. | 364/200 |
| 4,984,153 | 1/1991 | Kregness et al. | 364/200 |
| 4,992,930 | 2/1991 | Gilfeather et al. | 364/200 |
| 4,995,035 | 2/1991 | Cole et al. | 370/95.2 |
| 5,014,197 | 5/1991 | Wolf | 364/200 |

(List continued on next page.)

OTHER PUBLICATIONS

Wilson, Jr. "Hierarchical Cache/Bus Architecture for Shared Memory Multiprocessors", Computer Society Press of the IEEE, 1987.

Primary Examiner—Tod R. Swann
Assistant Examiner—Frank J. Asta
Attorney, Agent, or Firm—Nawrocki, Rooney & Sivertson, P.A.

[57] ABSTRACT

A method and apparatus for identifying obsolete data within cache memory in a multiprocessor architecture. This is accomplished while still providing the advantages of having cache resources dedicated to individual instruction processors as well as shared intermediate level cache modules. The technique provides the band pass and attendant performance advantages of an essentially point-to-point architecture without all of the added hardware of a centralized master system storage controller. Further, unlike a strictly point-to-point architecture, the present invention is readily expandable to service a large number of multiprocessors without burdening each of the multiprocessors with the corresponding increase in interface and connection costs of a strictly point-to-point architecture. This simplifies the design of the multiprocessor elements and also allows a system to be expanded to include more or less multiprocessors by simply including a modified XBAR interface. In a strictly point-to-point architecture, the multiprocessors may have to be modified to expanding a system because the interfacing circuitry associated therewith is contained therein. The present invention further has a means for increasing the performance of the XBAR interface by providing an anticipatory acknowledge signal back to a requesting multiprocessor.

60 Claims, 23 Drawing Sheets

U.S. PATENT DOCUMENTS

| | | | |
|---|---|---|---|
| 5,023,776 | 6/1991 | Gregor | 364/200 |
| 5,025,365 | 6/1991 | Mathur et al. | 364/200 |
| 5,025,366 | 6/1991 | Baror | 364/200 |
| 5,058,006 | 10/1991 | Durdan et al. | 364/200 |
| 5,113,522 | 5/1992 | Dinwiddie, Jr. et al. | 395/700 |
| 5,125,081 | 6/1992 | Chiba | 395/325 |
| 5,129,077 | 7/1992 | Hillis | 395/500 |
| 5,148,533 | 9/1992 | Joyce et al. | 395/425 |
| 5,165,018 | 11/1992 | Simor | 395/300 |
| 5,170,472 | 12/1992 | Cwiakala et al. | 395/275 |
| 5,175,824 | 12/1992 | Soderbery et al. | 395/312 |
| 5,193,163 | 3/1993 | Sanders et al. | 395/425 |
| 5,313,602 | 5/1994 | Nakamura | 395/425 |
| 5,375,220 | 12/1994 | Ishikawa | 395/451 |
| 5,471,592 | 11/1995 | Gove et al. | 395/312 |

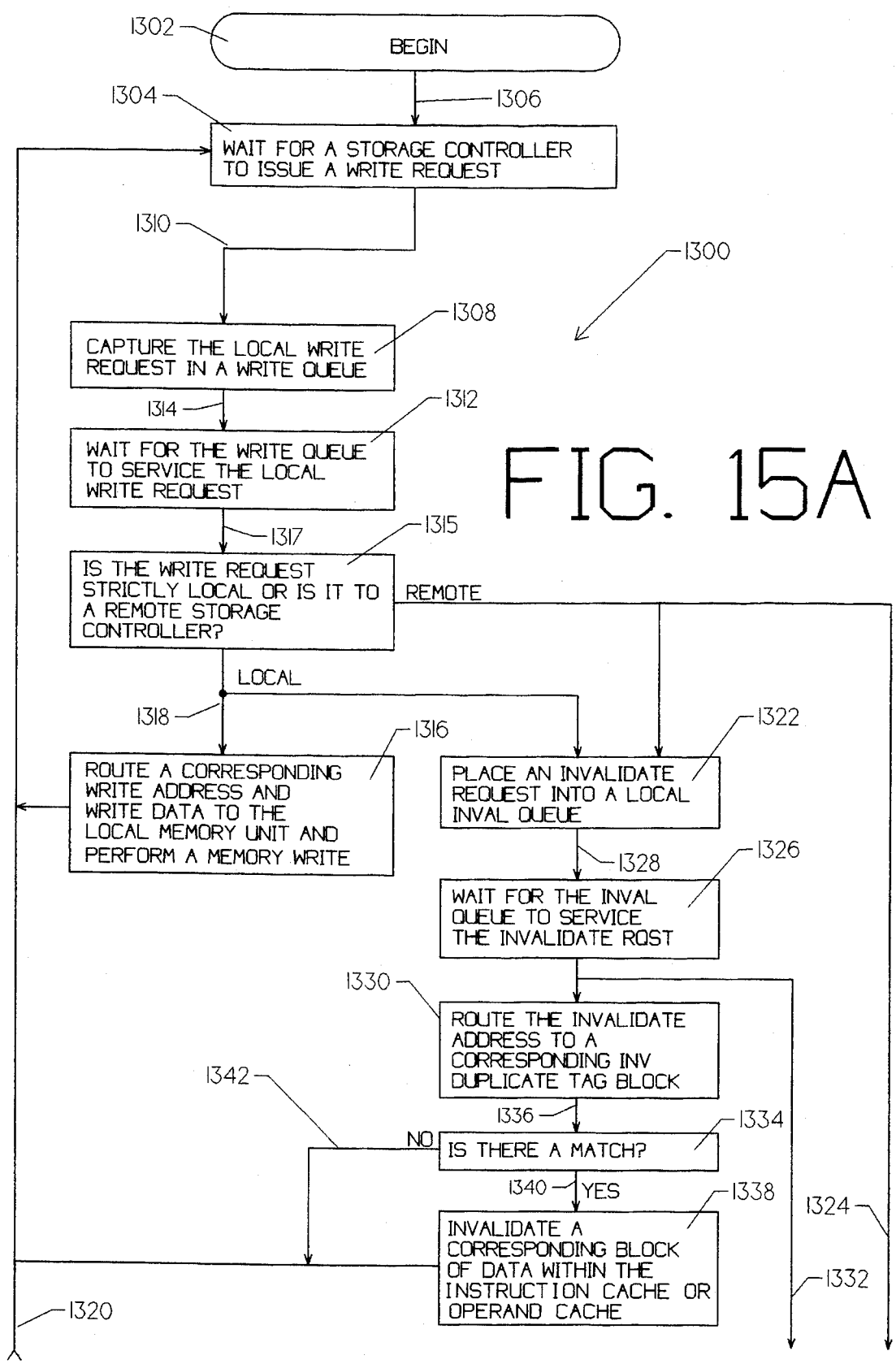

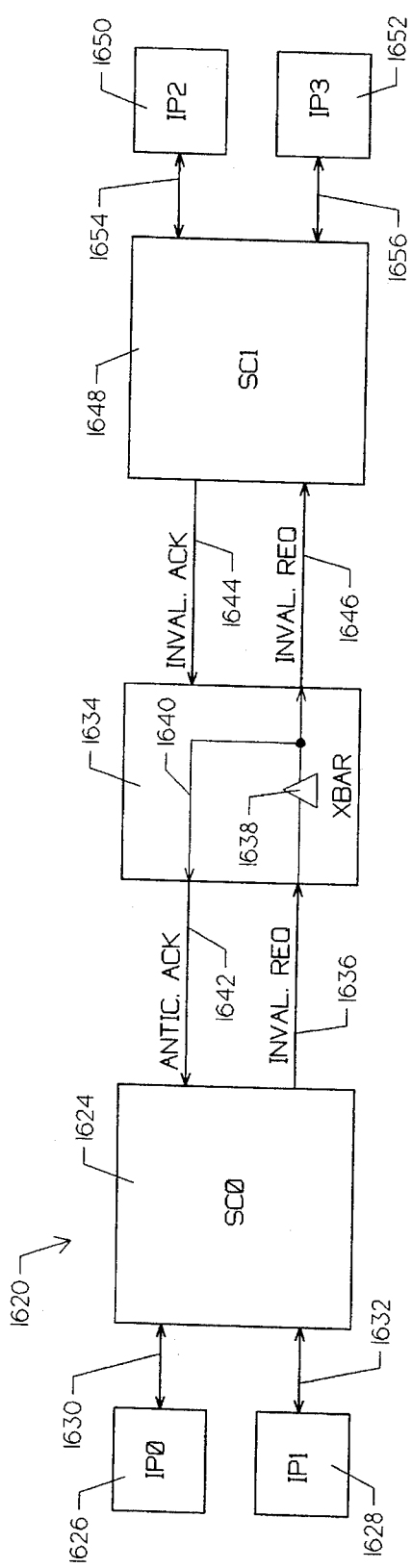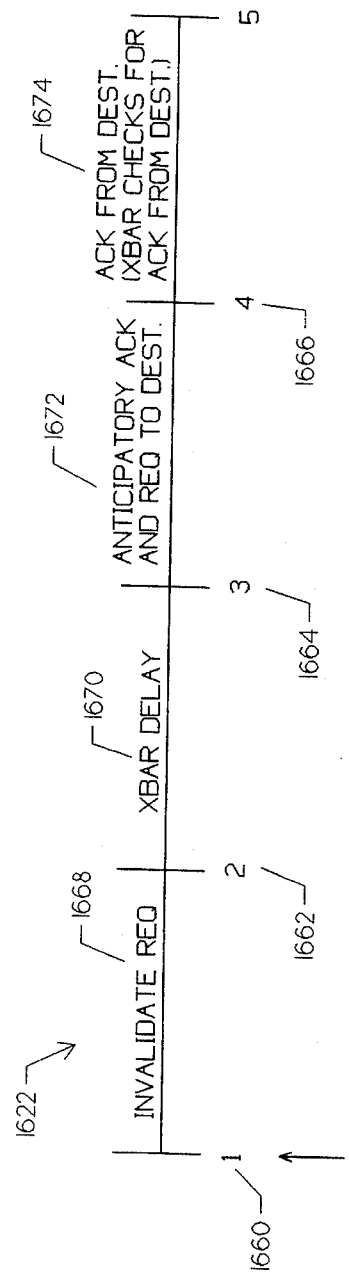

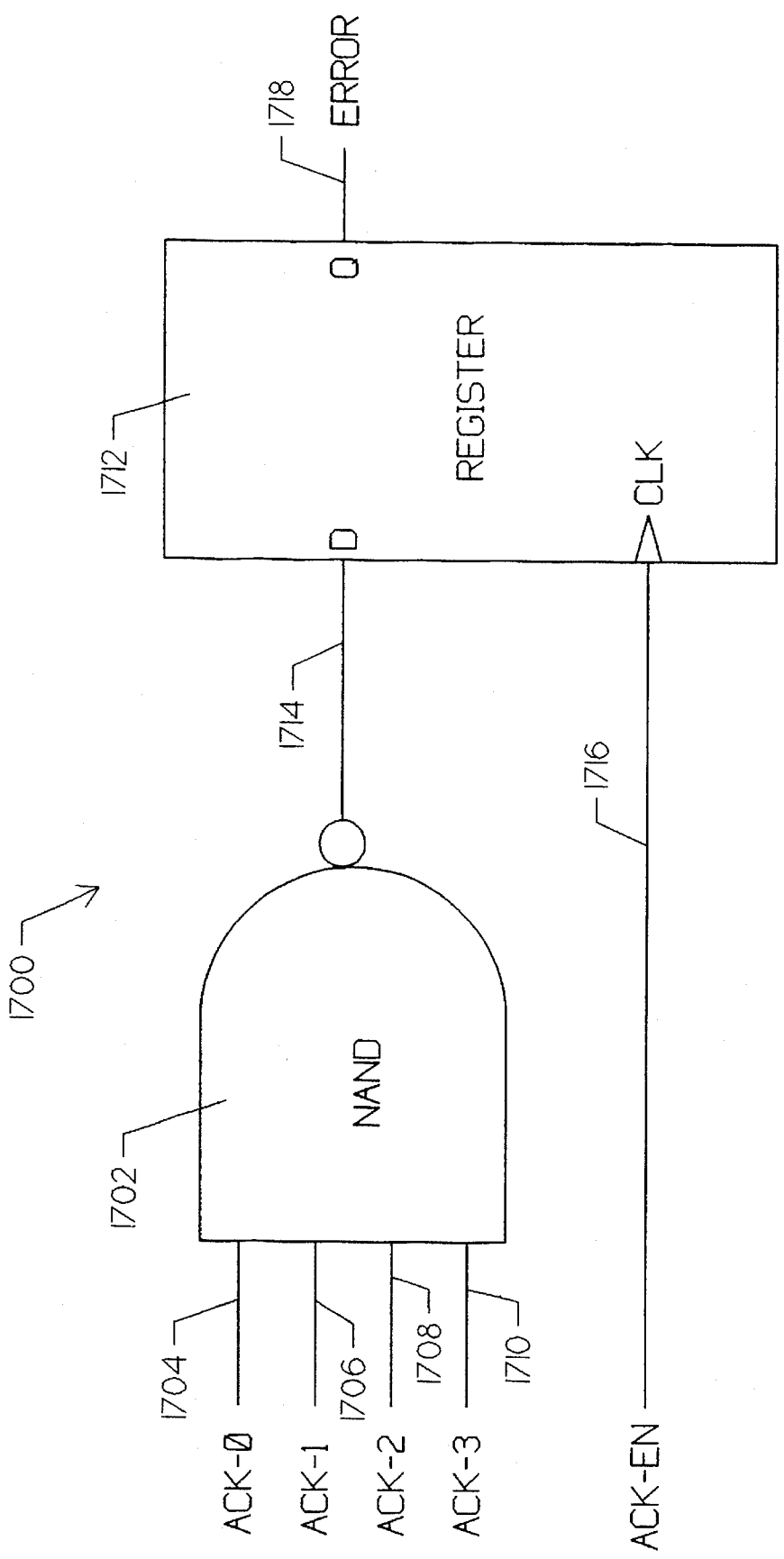

CACHE COHERENCY SCHEME FOR XBAR STORAGE STRUCTURE WITH DELAYED INVALIDATES UNTIL ASSOCIATED WRITE REQUEST IS EXECUTED

CROSS REFERENCE TO CO-PENDING APPLICATIONS

The present application is related to co-pending U.S. patent application Ser. No. 08/288,651, filed Aug. 9, 1994, entitled "Cooperative Hardware and Microcode Control System for Pipelined Instruction Execution" (which is a file wrapper continuation of U.S. patent application Ser. No. 07/762,282, filed Sep. 19, 1991, now abandoned), and U.S. patent application Ser. No. 08/235,196, filed Apr. 29, 1994, entitled "Data Coherency Protocol for Multi-Level Cached High Performance Multiprocessor System" (which is a continuation of U.S. patent application Ser. No. 07/762,276, filed on Sep. 19, 1991), both assigned to the assignee of the present invention and both incorporated herein by reference.

BACKGROUND OF THE INVENTION

1. Field of the Invention

The present invention relates generally to data processing systems employing multiple instruction processors and more particularly relates to multiprocessor data processing systems employing data coherency schemes.

2. Description of the Prior Art

It is known in the art that the use of multiple instruction processors operating out of common memory can produce problems associated with the processing of obsolete memory data by a first processor after that memory data has been updated by a second processor. The first attempts at solving this problem tended to use logic to lock processors out of memory spaces being updated. Though this is appropriate for rudimentary applications, as systems become more complex, the additional hardware and/or operating time required for the setting and releasing of locks cannot be justified, except for security purposes. Furthermore, reliance on such locks directly prohibits certain types of applications such as parallel processing.

The use of hierarchical memory systems tends to further compound the problem of data obsolescence. U.S. Pat. No. 4,056,844 issued to Izumi shows a rather early approach to a solution. The system of Izumi utilizes a buffer memory dedicated to each of the processors in the system. Each processor accesses a buffer address array to determine if a particular data element is present in its buffer memory. An additional bit is added to the buffer address array to indicate invalidity of the corresponding data stored in the buffer memory. A set invalidity bit indicates that the main storage has been altered at that location since loading of the buffer memory. The validity bits are set in accordance with the memory store cycle of each processor.

U.S. Pat. No. 4,349,871 issued to Lary describes a bussed architecture having multiple processing elements, each having a dedicated cache memory. According to the Lary design, each processing unit manages its own cache by monitoring the memory bus. Any invalidation of locally stored data is tagged to prevent use of obsolete data. The overhead associated with this approach is partially mitigated by the use of special purpose hardware and through interleaving the validity determination with memory accesses within the pipeline. Interleaving of invalidity determination is also employed in U.S. Pat. No. 4,525,777 issued to Webster et al.

Similar bussed approaches are shown in U.S. Pat. No. 4,843,542 issued to Dashiell et al, and in U.S. Pat. No. 4,755,930 issued to Wilson, Jr. et al. In employing each of these techniques, the individual processor has primary responsibility for monitoring the memory bus to maintain currency of its own cache data. U.S. Pat. No. 4,860,192 issued to Sachs et al, also employs a bussed architecture but partitions the local cache memory into instruction and operand modules.

U.S. Pat. No. 5,025,365 issued to Mathur et al, provides a much enhanced architecture for the basic bussed approach. In Mathur et al, as with the other bussed systems, each processing element has a dedicated cache resource. Similarly, the cache resource is responsible for monitoring the system bus for any collateral memory accesses which would invalidate local data. Mathur et al, provide a special snooping protocol which improves system throughput by updating local directories at times not necessarily coincident with cache accesses. Coherency is assured by the timing and protocol of the bus in conjunction with timing of the operation of the processing element.

An approach to the design of an integrated cache chip is shown in U.S. Pat. No. 5,025,366 issued to Baror. This device provides the cache memory and the control circuitry in a single package. The technique lends itself primarily to bussed architectures. U.S. Pat. No. 4,794,521 issued to Ziegler et al, shows a similar approach on a larger scale. The Ziegler et al design permits an individual cache to interleave requests from multiple processors. This design resolves the data obsolescence issue by not dedicating cache memory to individual processors. Unfortunately, this provides a performance penalty in many applications because it tends to produce queuing of requests at a given cache module.

The use of a hierarchical memory system in a multiprocessor environment is also shown in U.S. Pat. No. 4,442,487 issued to Fletcher et al. In this approach, each processor has dedicated and shared caches at both the L1 or level closest to the processor and at the L2 or intermediate level. Memory is managed by permitting more than one processor to operate upon a single data block only when that data block is placed in shared cache. Data blocks in dedicated or private cache are essentially locked out until placed within a shared memory element. System level memory management is accomplished by a storage control element through which all requests to shared main memory (i.e. L3 level) are routed. An apparent improvement to this approach is shown in U.S. Pat. No. 4,807,110 issued to Pomerene et al. This improvement provides prefetching of data through the use of a shadow directory.

A further improvement to Fletcher et al, is seen in U.S. Pat. No. 5,023,776 issued to Gregor. In this system, performance can be enhanced through the use of store around L1 caches used along with special write buffers at the L2 intermediate level. This approach appears to require substantial additional hardware and entails yet more functions for the system storage controller.

SUMMARY OF THE INVENTION

The present invention overcomes the problems found in the prior art by providing a method and apparatus for identifying obsolete data within cache memory in a multiprocessor architecture. The present invention further provides a mechanism for optimizing the performance thereof.

This is accomplished while still providing the advantages of having cache resources dedicated to individual instruction processors as well as shared intermediate level cache modules. The technique provides the band pass and attendant performance advantages of an essentially point-to-point architecture without all of the added hardware of a centralized master system storage controller. Further, unlike a strict point-to-point architecture, the present invention is readily expandable to service a large number of multiprocessors without burdening each of the multiprocessors with the corresponding increase in interface and connection costs. This simplifies the design of the multiprocessor elements and also allows a system to be expanded to include more or less multiprocessors by simply including a modified XBAR interface. In a point-to-point architecture, the multiprocessors may have to be modified to expand a system because the interfacing circuitry is contained therein.

In an exemplary embodiment, the overall system architecture may comprise the clustering of a plurality of instruction processors, input/output processors, and main memory modules about a storage controller. The instruction processors and input/output processors within a cluster may locally access the memory elements associated with the same storage controller. However, because a plurality of clusters may communicate over a cross-bar (XBAR) interface, each instruction processor and input/output controller may also make remote accesses to all other memory elements within the system. The XBAR interface is a connection scheme that allows multiple requesters to access multiple storage controllers in a parallel fashion. These remote accesses are inherently of higher performance than found in a bussed architecture because they are essentially point-to-point and may be performed in parallel. A further advantage of the XBAR interface scheme is that substantial hardware may be saved over a strict point-to-point architecture by not requiring that all of the storage controllers be burdened with the interface and connection costs associated therewith.

In an exemplary embodiment, each instruction processor within the system may have a dedicated instruction cache and a dedicated operand cache. The use of processor dedicated caches has the inherent performance advantage of lack of queuing at the requestor ports. Employing both instruction and operand caches promotes concurrency of cache accesses while at the same time simplifies the hardware interface to the instruction cache which has no write access. In the exemplary embodiment, both of these caches may interface directly with one or more intermediate level caches within the system controller. The intermediate level caches directly buffer data to and from an associated one of the main memory modules within the cluster. As such, the intermediate level caches are not dedicated to any particular one(s) of the processing elements. All local and remote accesses to a main memory modules are via the associated intermediate level cache. The intermediate level caches enhance performance by effectively matching main memory and requestor operating speeds without the complexity of dedication to one or several requestors.

Each instruction processor may maintain an address directory for both instruction and operand caches. These address directories may contain invalidity bits to signify obsolescence of the associated data block. A write access to a given data block in main memory may result in the setting of the corresponding invalidity bit, if any, in each dedicated cache using that data block.

In accordance with the present invention, duplicate address directories may be maintained within each storage controller for both instruction and operand caches of each instruction processor coupled directly to that storage controller. These duplicate address directories or tags are simply slaved to the instruction processor tags for all write operations. For remote write operations, the appropriate duplicate tags are searched using the XBAR interface. Upon matching a duplicate tag in the storage controller following a remote write operation, the corresponding invalidity bit(s) are set in the appropriate instruction processor(s) using the storage controller instruction processor interface. An individual instruction processor need not be referenced unless it has the corresponding memory block stored in its instruction and/or operand caches.

The present invention ensures the needed data integrity within the hierarchical storage system employing both shared and dedicated cache resources. This data integrity is provided by the essentially point-to-point communication between corresponding storage controllers via the XBAR interface. In this manner, the performance exceeds that of a bussed architecture and it does not require all of the dedicated hardware associated with complete point-to-point communication between each combination of storage controllers.

The XBAR interface confers substantial benefits to a multiprocessor system as described above. However, the XBAR interface may introduce an inconsistent cache model without one aspect of the present invention. That is, the XBAR interface of the present invention is designed to eliminate the inconsistent cache model thereby ensuring data coherency. In an exemplary embodiment, a first storage controller may perform a write operation in a memory located within a second storage controller. The first storage controller may send a write address and an invalidate address to each of the other storage controllers within the system. Each of the storage controllers may then determine whether a local memory located therein contains a copy of the data block that the first storage controller is attempting to write. If a second storage controller determines that it contains a copy of that pertinent data block, the second storage controller may invalidate the local copy of the data block as described above. The next time the second storage controller accesses the corresponding data block, the second storage controller may be forced to access main memory rather than the invalidated copy contained in local memory. It is recognized that other coherency algorithms may allow the second storage controller to access the first storage controller's cache rather than main memory to enhance performance.

In the exemplary embodiment, the write address and the invalidate address may take different logical paths to reach the second storage controller. Further, the write address and the invalidate address may travel through different queues before reaching the desired destination. Therefore, it is possible that the invalidate address could reach a second storage controller before the write address. If this occurs, the destination instruction processor may perform a read of the corresponding block of data. Since the corresponding block of data has previously been invalidated by the invalidate address, the destination instruction processor may read the data from main memory. However, the write address may not have reached the main memory that is associated with the cluster containing the destination instruction processor. As a result, the destination instruction processor may read old data and thus may operate thereon for an extended period of time. An important feature of the XBAR interface prevents this condition from occurring without unduly sacrificing system performance.

In an exemplary embodiment, whenever a storage controller performs a write request, that storage controller must make an invalidate request to all other storage controllers within the same partition. That is, the requesting storage controller must inform all other storage controllers within the partition that a block of data is being updated. If a storage controller within the same partition has a copy of the data in a local cache element or other storage means, that storage controller must get an updated copy of the data. Each of the remote storage controllers supplies an "invalidate acknowledge" signal back to the requesting storage controller indicating that the corresponding remote storage controllers knows about the data change. In a preferred mode, the requesting storage controller is not allowed to perform a subsequent write operation until all of the remote storage controllers have responded to the "invalidate request" signal by returning an "invalidate acknowledge" signal.

In a strictly point-to-point architecture, the requesting storage controller may receive all of the invalidate acknowledge signals directly from the remote storage controllers. This may occur on the next subsequent clock cycle after the requesting storage controller issues an invalidate request. However, when using the XBAR interface block discussed herein, the invalidate request/acknowledge path may become several clock cycles longer than the strictly point-to-point case. That is, the requesting storage controller may have to wait additional clock cycles before a subsequent write operation may be performed.

The present invention overcomes this problem by having the XBAR interface block issue an anticipatory acknowledge signal back to the requesting storage controller concurrent with the sending of the invalidate request to the remote storage controllers, thereby allowing the requesting storage controller to continue performing subsequent write operations in parallel with the invalidate request processing. The XBAR interface block may then monitor the returning invalidate acknowledge signals from all of the remote storage controllers to ensure they all respond properly. If any of the remote storage controllers do not respond properly, the XBAR interface block may issue an error and initiate an error recovery algorithm. This configuration allows the requesting storage controller to begin processing prior to receiving the invalidate acknowledge signals from the remote storage controllers. Only when a remote storage controller does not properly respond to the invalidate request does the system halt operation and perform error recovery. This may enhance the performance of the XBAR architecture.

BRIEF DESCRIPTION OF THE DRAWINGS

Other objects of the present invention and many of the attendant advantages of the present invention will be readily appreciated as the same becomes better understood by reference to the following detailed description when considered in connection with the accompanying drawings, in which like reference numerals designate like parts throughout the figures thereof and wherein:

FIG. 19A is a schematic diagram of a system utilizing the XBAR interface block showing the anticipatory acknowledge signal of the present invention;

FIG. 19B is a timing diagram showing the invalidate timing for the embodiment shown in FIG. 19A;

FIG. 20 is a schematic diagram showing an embodiment of the remote invalidate acknowledge monitoring hardware within the XBAR interface block.

DETAILED DESCRIPTION OF THE PREFERRED EMBODIMENT

Figure 1:
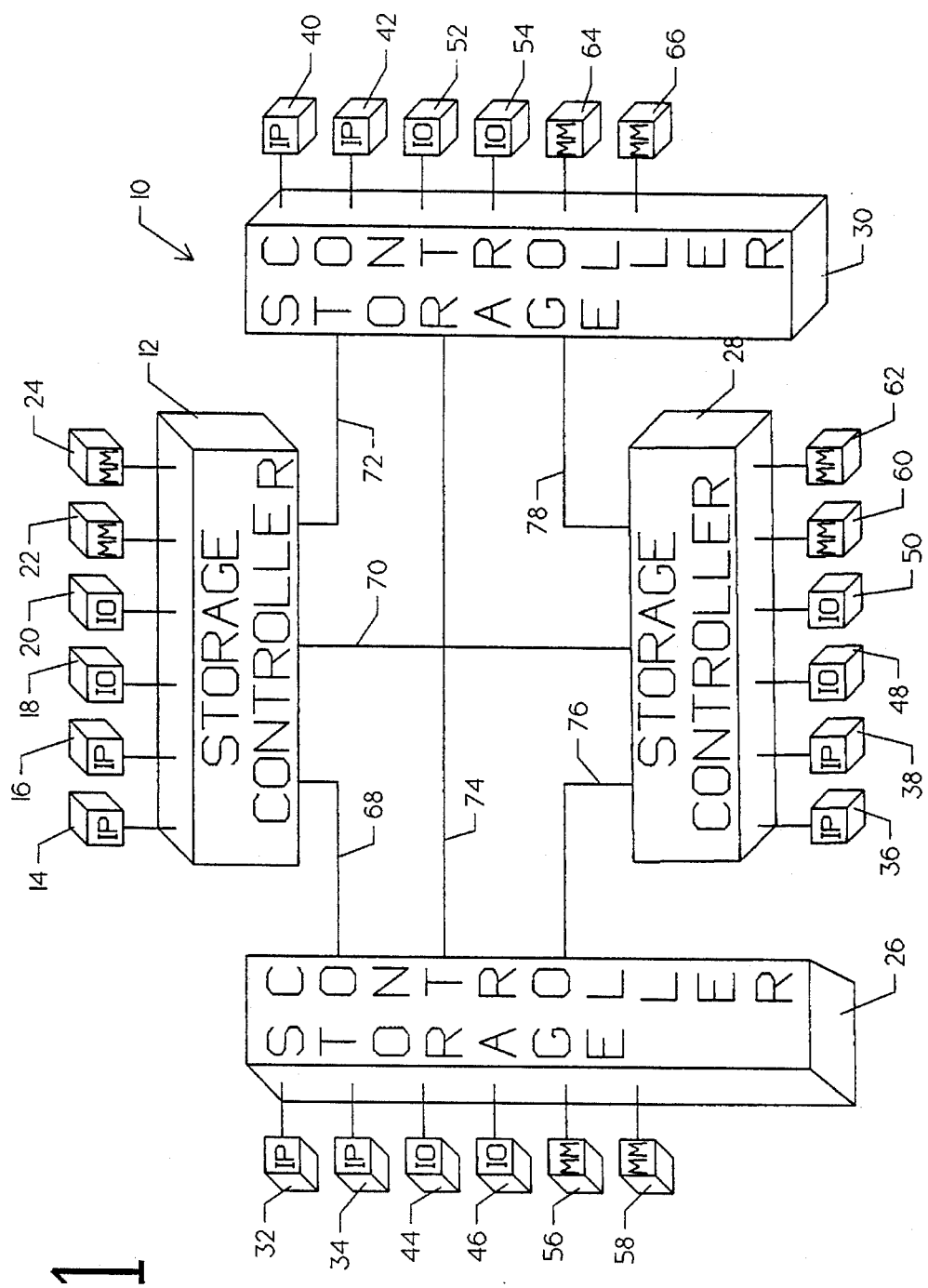
FIG. 1 is a block diagram of a fully populated system employing an essentially point-to-point architecture.

FIG. 1 is a block diagram of a data processing system 10 employing a point-to-point architecture. Data processing system 10 includes four individual processing clusters, each having its own storage controller and each having point-to-point communication with the other clusters via a storage controller to storage controller interface.

Storage controller 12 is coupled to storage controller 26 via interface 68. Similarly, storage controller 12 is coupled to storage controller 28 via interface 70 and to storage controller 30 via interface 72. Storage controller 26 communicates with storage controller 28 via interface 76 and to storage controller 30 via interface 74. In similar fashion, storage controller 28 and storage controller 30 are coupled via interface 78.

Storage controller 12 is fully populated with instruction processor 14, instruction processor 16, input/output processor 18, input/output processor 20, main memory module 22 and main memory module 24. Each of instruction processors 14 and 16 (along with similar instruction processors 32, 34, 36, 38, 40, and 42) has internal dedicated cache resources in the form of an instruction cache and an operand cache. These elements, along with the associated data invalidity logic, are described in more detail below. A more general description of the construction and operation of instruction processors 14 and 16 may be found in the above referenced and commonly assigned co-pending U.S. Patent Application, entitled "Cooperative Hardware and Microcode Control System for Pipelined Instruction Execution", which has been incorporated by reference.

Input/output processors 18 and 20, along with main memory modules 22 and 24, may be elements currently available, such as found in the Unisys Model 2200/900 series. Input/output processors 44, 46, 48, 50, 52, and 54 and main memory modules 56, 58, 60, 62, 64, and 66 may be similarly found.

A more general description of the construction and operation of the system shown in FIG. 1 may be found in the above referenced and commonly assigned co-pending U.S. Patent Application, entitled "Data Coherency Protocol for Multi-Level Cached High Performance Multiprocessor System", which has been incorporated by reference.

Figure 2:
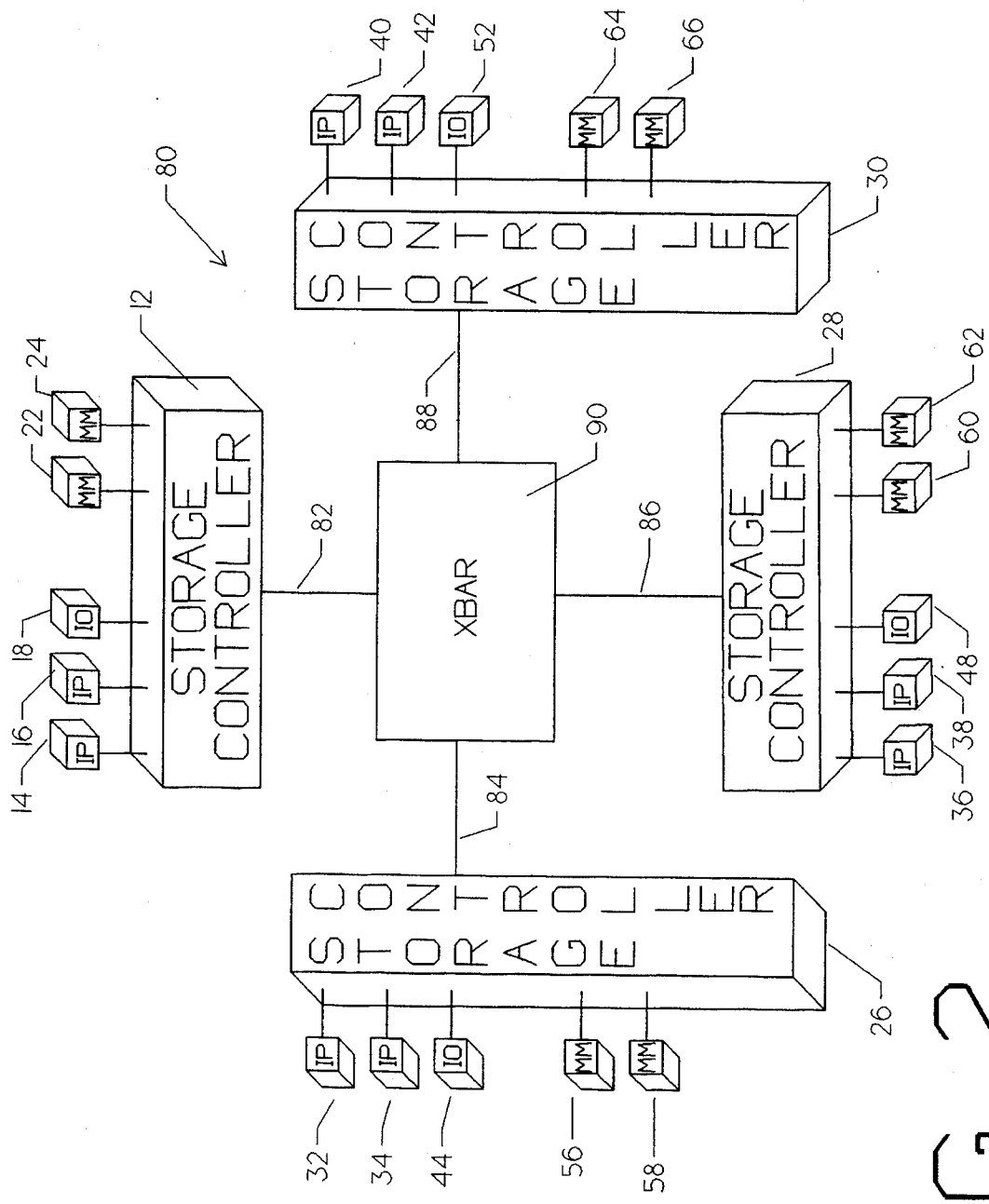
FIG. 2 is a block diagram of a fully populated system employing an XBAR interface block in accordance with the present invention.

FIG. 2 is a block diagram of a data processing system 80 employing an XBAR interface block 90 in accordance with the present invention. Like the data processing system shown in FIG. 1, data processing system 80 includes four individual processing clusters, each having its own storage controller. Each storage controller may be in communication with all other clusters via XBAR interface block 90.

In the point-to-point system shown in FIG. 1, each of the storage controllers contains a storage controller-to-storage controller interface which manages the communication between the attendant storage controllers. If there are four storage controllers in the data processing system as shown in FIG. 1, each storage controller may manage the communication between itself and the other three storage controllers. This system is optimal if the number of storage controllers is limited. However, as the number of storage controllers that are incorporated into the data processing system increases, the complexity of the interfacing circuitry within each of the storage controllers also increases because of the increased number of point-to-point communication links within the system. Moreover, to expand a system to include additional clusters, each of the storage controllers must be replaced with a storage controller that can handle the additional point-to-point communication links created therein. At the same time, for systems with only a few storage controllers, the extra interfaces are not used and in fact are a cost burden.

In an exemplary embodiment of the present invention, a portion of the interface function between the storage controllers is moved from the storage controllers themselves into XBAR interface block 90. This moves the interface and connection costs from the storage controllers and places them into a centralized location. In this way, the interfacing and connection costs may be minimized.

This improvement may be especially important when a large number of storage controllers (e.g.>four) are included within a system. When more than four storage controllers are included in a system, the interface and connection costs become a substantial burden on each storage controller. This burden may be relieved by including XBAR interface block 90. Further, in systems that may be expandable, it may be advantageous to include XBAR interface block 90 such that each of the storage controllers may not have to be modified or replaced when a system is upgraded to include more storage controllers. Rather, XBAR interface block 90 may be designed to be expandable itself or a different XBAR interface block 90 may be placed within the system along with the additional storage controllers when an upgrade is made. As can be seen, XBAR interface block 90 may have significant advantages over an essentially point-to-point architecture. However, for relatively few storage controllers (e.g.≦four), an essentially point-to-point architecture may be preferred because it may be faster and require less physical space.

Storage controller 12 is coupled to XBAR interface block 90 via interface 82. Storage controller 26 is coupled to XBAR interface block 90 via interface 84. Storage controller 28 is coupled to XBAR interface block 90 via interface 86. Storage controller 30 is coupled to XBAR interface block 90 via interface 88. Storage controller 12 may communicate with storage controllers 26, 28, and 30 via XBAR interface block 90. Storage controller 26 may communicate with storage controllers 12, 28, and 30 via XBAR interface block 90. Storage controller 28 may communicate with storage controllers 12, 26, and 30 via XBAR interface block 90. Similarly, storage controller 30 may communicate with storage controllers 12, 26, and 28 via XBAR interface block 90.

Storage controller 12 is fully populated with instruction processor 14, instruction processor 16, input/output processor 18, main memory module 22 and main memory module 24. Each of instruction processors 14 and 16 (along with similar instruction processors 32, 34, 36, 38, 40, and 42) has internal dedicated cache resources in the form of an instruction cache and an operand cache. These elements, along with the associated data invalidity logic, are described in more detail below. A more general description of the construction and operation of instruction processors 14 and 16 may be found in the above referenced and commonly assigned co-pending U.S. Patent Application, entitled "Cooperative Hardware and Microcode Control System for Pipelined Instruction Execution", which has been incorporated by reference.

Input/output processor 18, along with main memory modules 22 and 24, may be elements currently available, such as found in the Unisys Model 2200/500 series. Input/output processors 44, 48, and 52 and main memory modules 56, 58, 60, 62, 64, and 66 may be similarly found.

Figure 3:
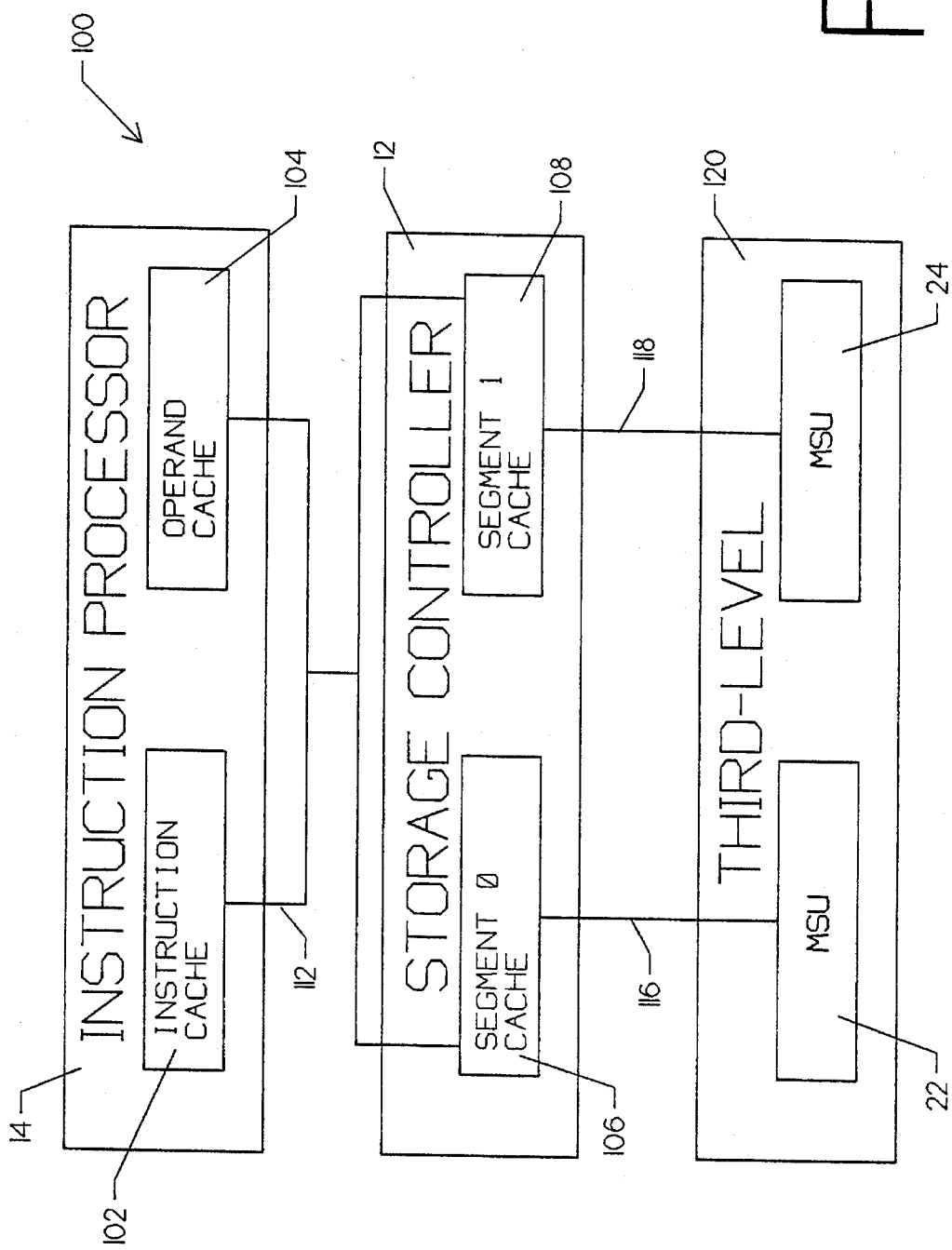
FIG. 3 is a schematic flow diagram of the memory hierarchy.

FIG. 3 is a flow diagram 100 showing the hierarchical arrangement of the three levels of data processing system 10. Instruction processor 14 contains an instruction cache 102 and an operand cache 104, each storing 8k of 36 bit words. These are internal to instruction processor 14 and dedicated to the operations undertaken therein. By partitioning the internal dedicated cache resources in this manner, there is a certain concurrency of cache accesses associated with normal instruction execution.

Upon the request of instruction processor 14 to access a particular data element as either an instruction or operand, the directory of instruction cache 102 or operand cache 104, respectively, is queried to determine if the required data element is present within the associated cache resource. If the data element is present and valid, the access is completed at that level. If not, access is made to storage controller 12 via interface 112 for the block of eight 36 bit words containing the desired data element. A more detailed explanation of the operation of instruction cache 102 and operand cache 104 is found below.

Storage controller 12 contains an intermediate level cache segment of 128k 36 bit words for each main memory module within the cluster. In the present illustration, storage controller 12 contains segment-0 cache 106 and segment-1 cache 108. These cache resources are shared by all users of the main memory within the cluster to include both local and remote users. Any memory request to storage controller 12 is routed to the appropriate directory of segment-0 cache 106 or segment-1 cache 108 to determine if the desired data element is present. This routing is based upon the address requested, since the intermediate cache resources are partitioned in address space to correspond to the associated main memory module.

If present, the requested data element is supplied as an eight word block. If the requested data element is not present in segment-0 106 or segment-1 108 (depending upon the requested address), the data is requested from third level storage 120 containing main memory modules 22 and 24 via interfaces 116 and 118, respectively. In the preferred mode, main memory modules 22 and 24 each contain 64 MEG words of storage.

Each data element request to storage controller 12 is made through a separate interface. For a fully populated system as shown in FIG. 2, this includes two instruction processors, an input/output processor, and at least four other storage controllers (see also FIG. 2). Each data element request is divided between segment-0 cache 106 and segment-1 cache 108 based upon requested address. Only if the requested data element is not present in the appropriate intermediate level cache resource is an access request made to third level 120.

Figure 4:
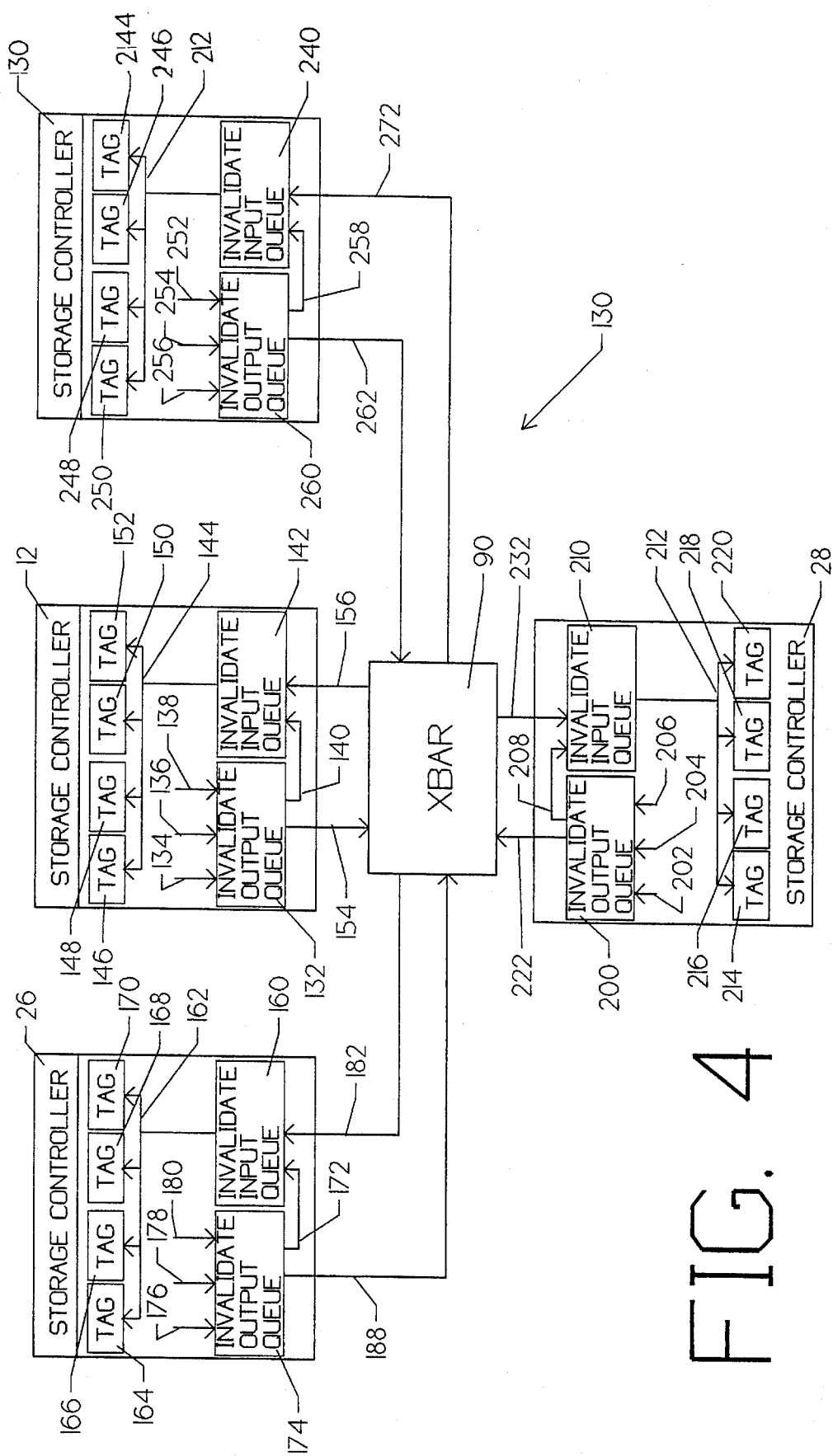
FIG. 4 is a schematic diagram for the storage controller to storage controller data invalidation interface utilizing the XBAR interface block.

FIG. 4 is an overall schematic diagram 130 of the data invalidation interface between each of the pairs of storage controllers of data processing system 80 (see also FIG. 2). Storage controller 12 includes invalidate output queue 132, invalidate input queue 142, and duplicate tags 146, 148, 150, and 152. Duplicate tags 146 are associated with operand cache 104 of instruction processor 14 (see also FIG. 3) and duplicate tags 148 are associated with instruction cache 102 of instruction processor 14. Similarly, duplicate tags 150 and 152 are associated with the operand and instruction caches of instruction processor 16 (see also FIG. 2), respectively.

Invalidate output queue 132 receives inputs corresponding to the write requests of the local requesting processors. Interface 134 represents a write request from instruction processor 14. Interface 136 transfers write requests from instruction processor 16, and interface 138 transfers write requests from input/output processor 18. Each of these interfaces carries the requested address and the request timing signals.

Invalidate output queue 132 prioritizes these write requests and transfers corresponding invalidate signals to local invalidate input queue 142 via interface 140 and to XBAR interface block 90 via cable 154. XBAR interface block 90 may transfer the corresponding invalidate signals to invalidate input queue 160 of storage controller 26 via cable 182, invalidate input queue 210 of storage controller 28 via cable 232, and invalidate input queue 240 of storage controller 30 via cable 272. Invalidate output queue 174 of storage controller 26 receives local write request inputs on cables 176, 178, and 180 and responds via cable 188 and via interface 172.

Similarly, invalidate output queue 200 of storage controller 28 and invalidate output queue 260 of storage controller 30 receive local write requests via interfaces 202, 204, 206, 256, 254, and 252 and respond via cables 222 and 262 and via interfaces 208 and 258, respectively. In this manner, the invalidate input queue of each storage controller, including the local invalidate input queue, is notified of a potentially invalidating write operation. Invalidate output queue 132 is described in more detail below.

Invalidate input queue 142 receives local invalidate requests from interface 140 and remote invalidate requests via cable 156 in order to determine whether any first level (i.e. instruction processor dedicated) cache(s) needs to be invalidated because of the local or remote write operation. Whether an invalidation is needed is determined by fanning out the invalidate address to duplicate tags 146, 148, 150, and 152 via interface 144. If the invalidity (write) address is resident in the duplicate tags, the corresponding invalidity bits of the associated instruction processor are also set in accordance with the circuitry explained in more detail below.

Storage controller 26 contains invalidate input queue 160, interface 162, and duplicate tags 164, 166, 168, and 170; storage controller 28 contains invalidate input queue 210, interface 212, and duplicate tags 214, 216, 218, and 220; and storage controller 30 contains invalidate input queue 240, interface 242, and duplicate tags 250, 248, 246, and 244, all of which function in a similar manner.

Figure 5:
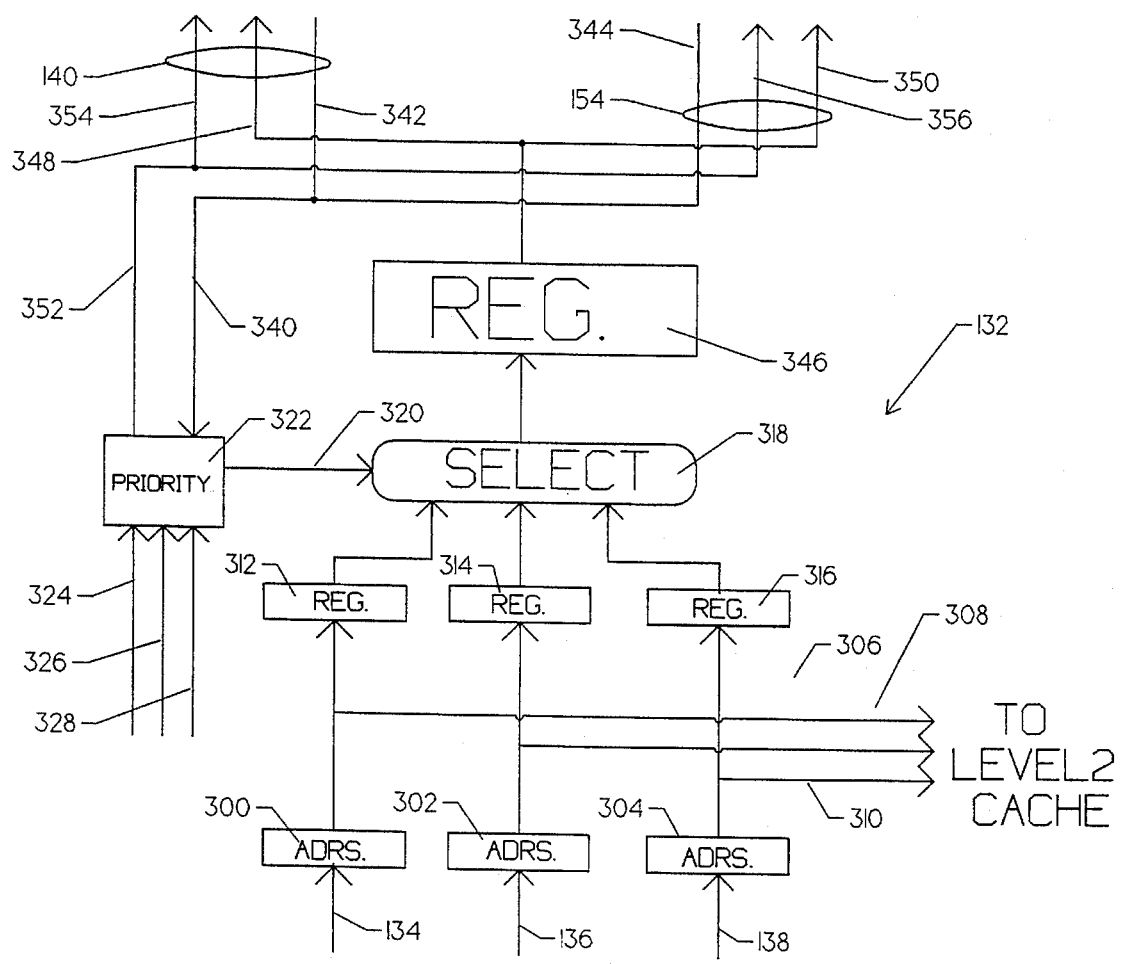
FIG. 5 is a schematic diagram of the invalidate output queue.

FIG. 5 is a detailed schematic diagram of invalidate output queue 132. Local write requests are received from instruction processor 14 via interface 134, instruction processor 16 via interface 136, and input/output processor 18 via interface 138. These write requests include the requested addresses which are stored in address registers 300, 302, and 304 and control signals for ensuring effective transfer of the information. Interfaces 306, 308, and 310 convey the write requests to the intermediate level (i.e. level 2) caches for access of the requested data as explained above.

The write request addresses are also temporarily stored in registers 312, 314, and 316 for priority selection. The timing of the requesting processor is identified to priority logic 322 by request lines 324, 326, and 328. Priority is provided equally in time ordered fashion to all requestors. Selector 318 is notified of the priority determination by line 320. The address of the priority selected write operation request is transferred to register 346 for temporary storage and is hereafter referred to as an invalidate address. It is this address which is supplied to the invalidate input queue of each storage controller within the system.

The actual address is transferred in parallel over lines 348 of interface 140 to local invalidate input queue 142 (see also FIG. 4). The same address is transferred over lines 350 of cable 154 to XBAR interface block 90. As stated above, XBAR interface block 90 may direct the address to invalidate input queue 160 of storage controller 26 via interface 182, to invalidate input queue 210 of storage controller 28 via interface 232, and to invalidate input queue 240 of storage controller 30 via interface 272. Output 352 of priority logic 322 is the timing signal which notifies the receiving invalidate input queue of the presence of the invalidate address. Line 354 transfers this timing signal locally via interface 140. Line 356 transfers this timing signal remotely via cable 154 to XBAR interface block 90. Acknowledgement of the receipt of the invalidate request address by the appropriate invalidate input queue is via invalidate acknowledge lines 342 and 344 of interfaces 140 and 154, respectively. These acknowledge signals are transferred to priority logic 322 by interface 340 to enable priority logic 322 to entertain the next write request following completion of the transfer of the address of the previous write request to each of the invalidate input queues within the system.

Figure 6:
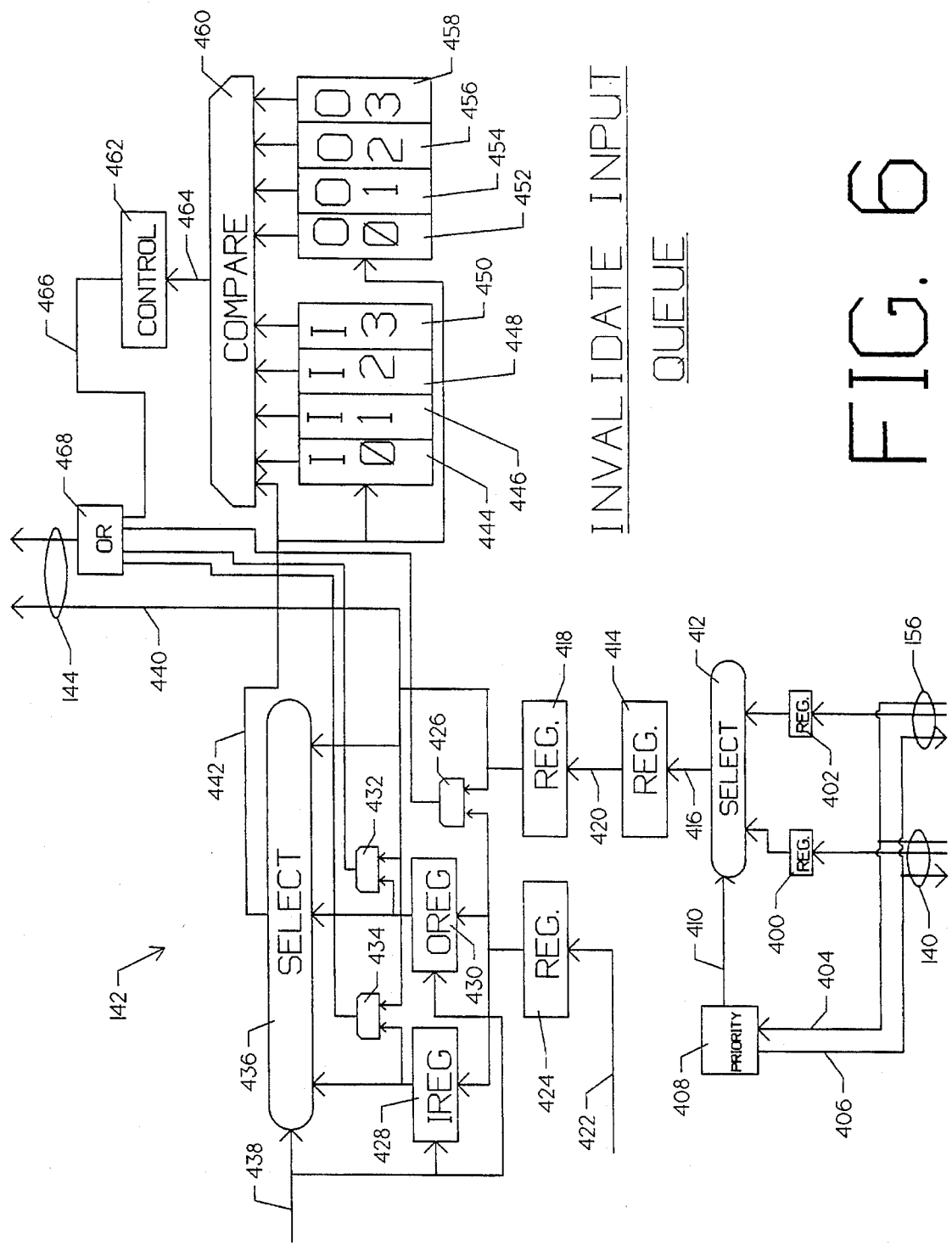
FIG. 6 is a schematic diagram of the storage controller invalidate input queue.

FIG. 6 is a detailed schematic diagram of invalidate input queue 142. Local invalidate requests are received via interface 140. Remote invalidate requests are received from storage controllers 26, 28, and 30 via XBAR interface block 90 on cable 156. The invalidate address portion of the request is temporarily stored in registers 400 and 402. The invalidate request timing signal is transferred to priority circuit 408 by interface 404 for priority determination. After a given invalidate request has been granted priority by priority circuit 408, interface 410 notifies selector 412 to select the corresponding invalidate address for transfer to register 414, and the completion of the transfer is acknowledged to the sending invalidate output queue via interface 406 (see also FIG. 5).

The duplicate tags must be updated whenever new data is stored in an instruction processor cache. The address to be updated is transferred from the instruction processor to the duplicate tags via interface 422 and held in register 424. Control bits accompany the address via interface 438. These control bits are used to determine whether the address in register 424 is ported to the instruction cache read buffer tag holding register 428 or the operand cache read buffer tag holding register 430.

The control bits received via interface 438 are also used to select whether a duplicate tag update or an invalidity search is done. If a duplicate tag update is to be done, the address in either register 428 or register 430 is ported via interface 442 to the duplicate tags. Otherwise the invalidate address in register 418 is ported to the duplicate tags and an invalidity search is done.

The requested invalidate address in register 418 is compared by comparator 426 to the read buffer tag supplied from the local first level cache by interface 422 as buffered by register 424. The same type of address comparisons are made by comparators 432 and 434 to permit the maximum pipelining of the operation. Registers 428 and 430 serve to buffer the duplicate operand and instruction tag addresses, respectively.

The control bits received via interface 438 enable selector 436 to select the duplicate tag invalidate address. This address is supplied via interface 442 to compare 460 for comparison with the duplicate tags. Duplicate tags 444, 446, 448, and 450 are associated with the corresponding tags for blocks 0, 1, 2, and 3 of instruction cache 102 of instruction processor 14 (see also FIG. 3). Similarly, duplicate tags 452, 454, 456, and 458 correspond to the tags for operand cache 104 of instruction processor 14. Not shown for clarity are the duplicate instruction and operand tags for instruction processor 16 which function in a similar manner.

Control circuit 462 is notified via interface 464 of the presence and identity of a duplicate invalidity tag hit. Control circuit 462 responds by notifying instruction processor 14 via lines 466 of interface 144 (see also FIG. 4). This is accompanied by the invalidate request address transferred via lines 440 of interface 144 resulting from comparisons 426, 432, and 434.

Figure 7:
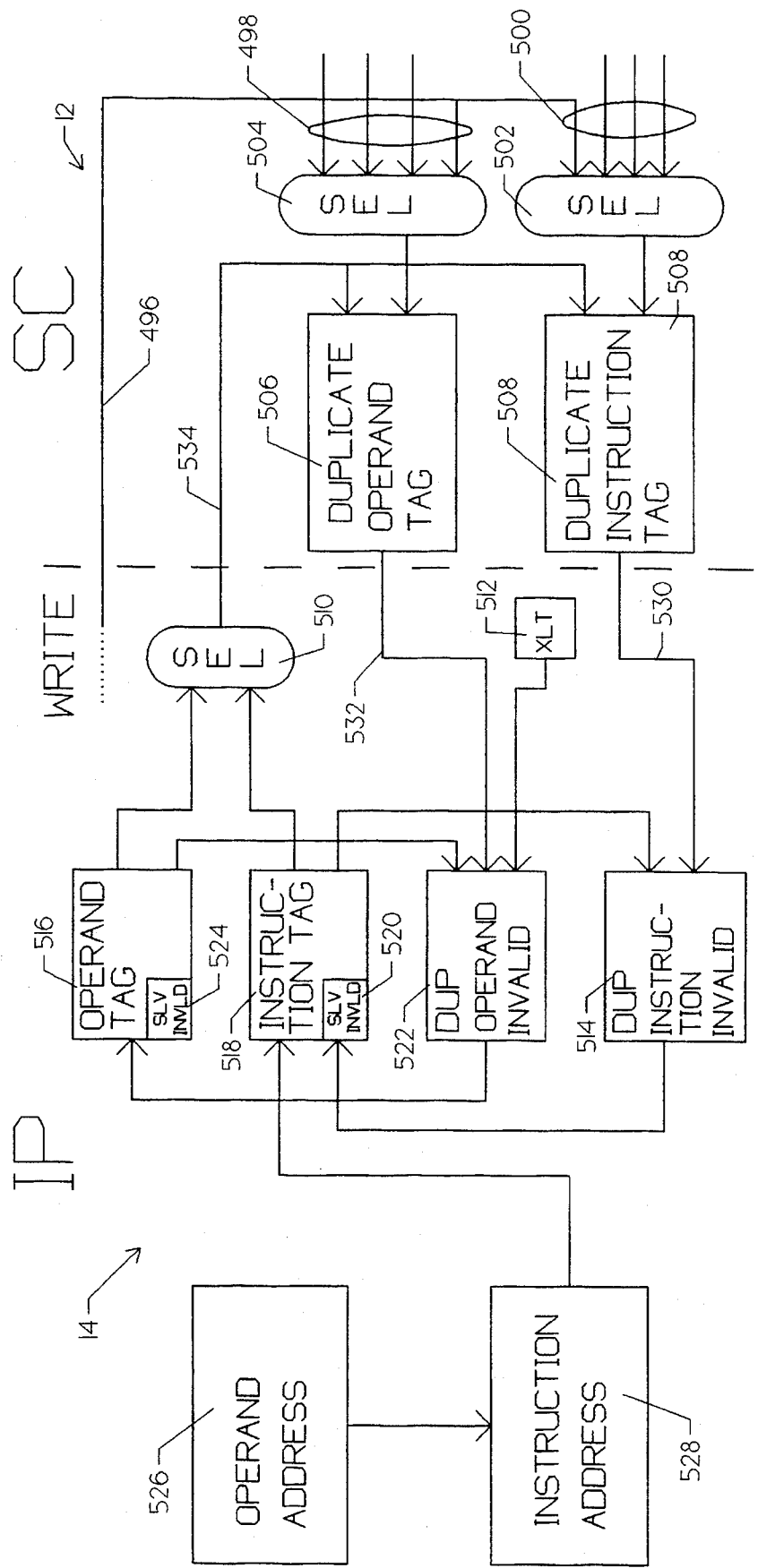
FIG. 7 is a schematic diagram of the storage controller/ instruction processor invalidate interface.

FIG. 7 is an overall schematic view of the invalidation interface between storage controller 12 and instruction processor 14. Write requests generated by instruction processor 14 are shown as symbolically transferred to selector 502 by lines 496, whereas the other write requests are received on the remaining lines of interface 500 and interface 498. Selectors 502 and 504 select from the multiple coincident requests on a priority basis as described in more detail above.

Duplicate operand tags 506 (comprising duplicate tags 452, 454, 456, and 458 as seen in FIG. 6) are searched by the output of selector 504 in the manner described above and updated by output 534 of selector 510. Similarly, duplicate instruction tags 508 (comprising duplicate tags 444, 446, 448, and 450 as seen in FIG. 6) are searched by the output of selector 502 and updated by output 534 of selector 510. Instruction processor 14 is notified of the setting of a one of the duplicate tags as described above and as shown schematically herein by lines 532 and 530.

Duplicate operand invalidity bits 522 comprise the actual invalidity bits for operand cache 104 of instruction processor 14. These are set by storage controller 12 via interface 532. These are linked to slave invalidity bits 524 of operand tags 516. Setting occurs following notification via line 532 of the invalidating write request. Clearing of the invalidity bit occurs following a restore into the associated block of operand cache 104. Translation logic 512 provides translation between the page addressing of the dedicated processor and the block addressing of the memory system.

Instruction tags 518, containing slave invalidity bits 520 which are copies of duplicate instruction invalidity bits 514, operate in a similar fashion. In addition, operand address circuitry 526 notifies instruction address circuitry 528 of the need to set an invalidity flag for the special case of an operand written directly into the instruction stream.

Figure 8:
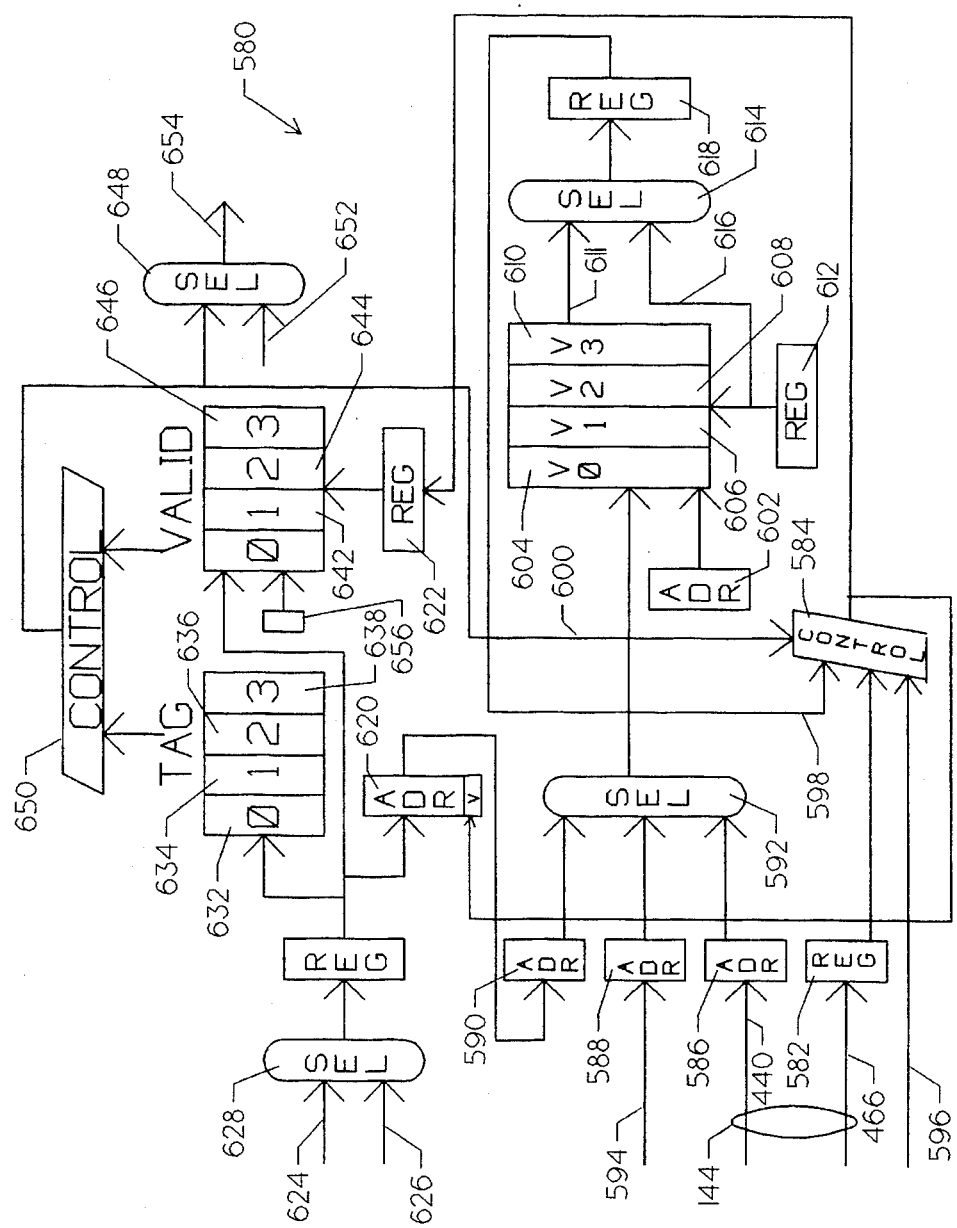
FIG. 8 is a schematic diagram of the instruction processor operand cache and corresponding invalidity tags.

FIG. 8 is a detailed schematic diagram 580 of the operand invalidate circuitry of instruction processor 14. The invalidation notification is received via interface 144 as an address over lines 440 and control signals over line 466 (see also FIG. 6). The control signals are routed for buffering to register 582 and then to control circuit 584 which determines the operating mode of the remainder of the circuitry at any instant. Line 596 indicates an invalidate upon updating of the page directory. Line 598 signifies a read-modify-write operation. An operand read miss is indicated by line 600. The remaining mode validates a read buffer reference if the invalidity bit corresponding to the address tag for that block is not set.

The invalidate address from storage controller 12 is buffered in address register 586. Address register 588 buffers an address received from the page translator via lines 594. The operand cache miss/set address is received from address register 620 and buffered by address register 590. Selector 592 selects one of the addresses from one of these registers depending upon the mode of operation. The output of selector 592 is transferred as a read set address to the duplicate invalidity bits comprising 604, 606, 608, and 610. The write set address is stored in address register 602 and the invalidity bits are stored in register 612. Selector 614 selects from the interface 611 representing the output of the duplicate operand invalidity bits or output 616 of register 612. This selection is buffered in register 618 and supplied as line 598 to control circuit 584 to control the read-modify-write operation.

Operand tag blocks 632, 634, 636, and 638 are addressed by the set address represented by the absolute address stored in register 630. This is one of outputs 624 or 626 of the operand address generator as selected by selector 628. Depending upon the operation being performed, operand validity tag blocks 640, 642, 644, and 646 are accessed by the set address from absolute address register 630 or from the write set address stored in address register 656. Control circuit 650 controls the mode representing an operand cache directory miss. This is signaled to control circuit 584 by line 600 for control of that mode.

Selector 648 notifies storage controller of a cache read miss via line 654. This may be either an operand cache miss as represented by line 600 or an instruction cache miss as represented by line 652.

Figure 9:
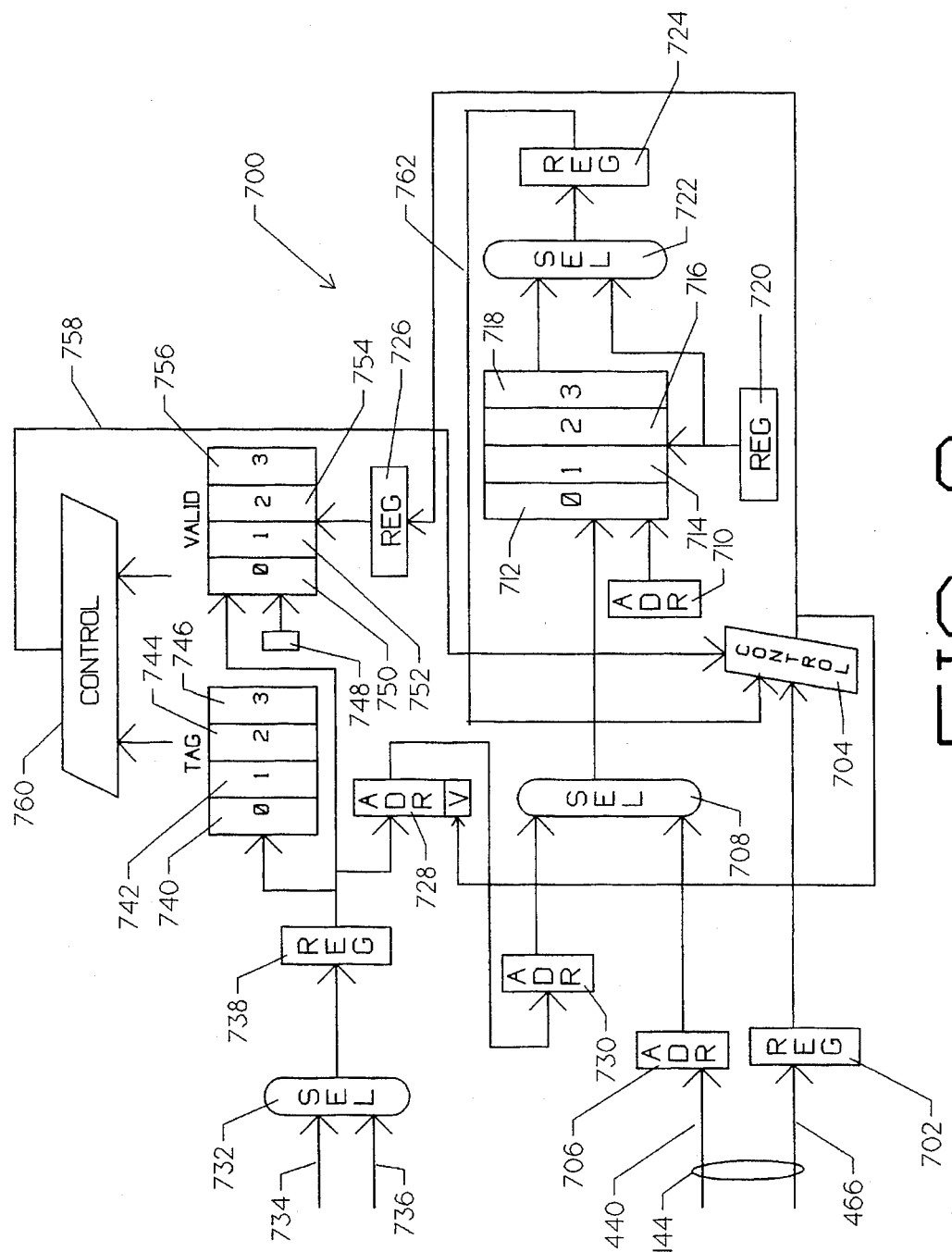
FIG. 9 is a schematic diagram of the instruction processor instruction cache and corresponding invalidity tags.

FIG. 9 is a detailed schematic diagram 700 of the invalidation logic of instruction processor 14 associated with instruction cache 102. Selector 732 selects an instruction address from interfaces 734 and interface 736 as generated by the instruction address circuit. The absolute address is stored in register 738. This is presented as a set address to tags 740, 742, 744, and 746. This same address is presented to invalidity bits 750, 752, 754, and 756. A write set address may be presented by address register 748 and valid memory in register 726. The outputs are presented to control circuit 760 for notification of a valid cache hit. If a read miss is encountered, control circuit 704 is notified by line 758 for mode change.

Address registers 728 and 730 buffer the absolute and set addresses of the instruction cache miss. Selector 708 selects between that address and the output of address register 706 containing the write request address from lines 440 of interface 144 (see also FIG. 6). The selected read address is presented to duplicate invalid bits 712, 714, 716, and 718. These may also be accessed by the write set address stored in address register 710 along with the invalidity memory in register 720.

When processing a tag invalidation request from storage controller 12, the timing control signal is supplied by line 466 of interface 144 (see also FIG. 6). This signal is supplied to control circuit 704 for mode control.

Selector 722 selects from the set address taken from tags 712, 714, 716, and 718 or from register 720. This address is buffered by register 724 and supplied to control circuit 704 for the read-modify-write mode. In all other respects, the instruction cache invalidate logic functions similar to the operand invalidate logic discussed in more detail above.

Figure 10:
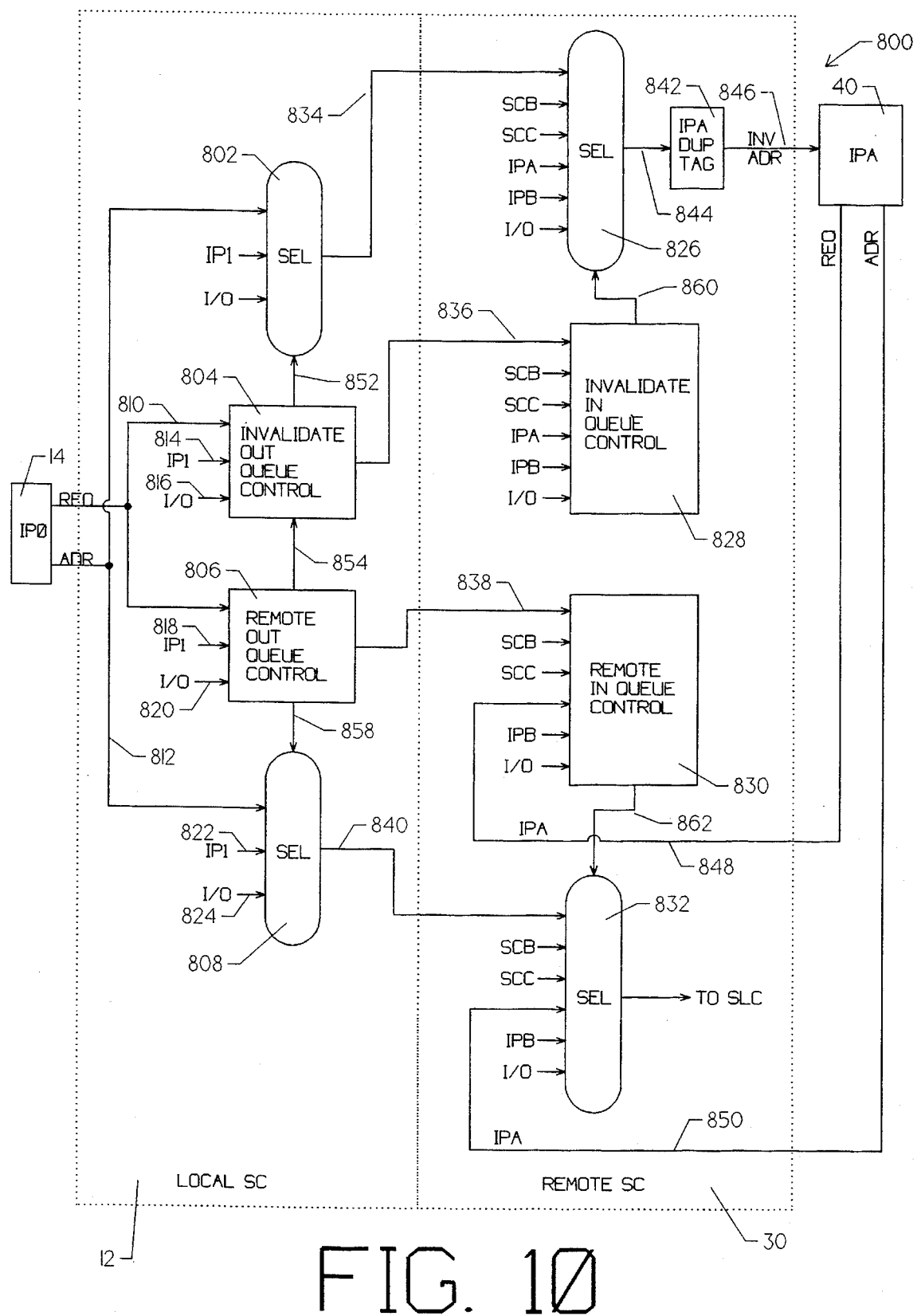
FIG. 10 is a detailed schematic diagram of a local storage controller and a remote storage controller interface utilizing a point-to-point architecture.

FIG. 10 is a detailed schematic diagram of a local storage controller and a remote storage controller interface utilizing a point-to-point architecture. Referring to FIG. 1, the exemplary embodiment shown in FIG. 10 illustrates the communication link from IP 14, through storage control 12, across interface 72, through storage control 30, and finally to IP 40. Local IP0 14 may execute a store instruction to a remote memory address. In the exemplary embodiment shown in FIG. 10, the remote memory location may be located in the instruction or operand cache elements within IP 40 or IP 42, within the segment-0 or segment-1 cache elements within storage controller 30, or within main memory modules 64 or 66. The store instruction may issue a write request, a write address, and write data to storage controller 12.

Storage controller 12 may route the write request to remote out queue control 806. Storage controller 12 may route the write address to SEL 808. Remote out queue control 806 and SEL 808 comprise a remote out queue. The remote out queue then selects one of three local requests to be routed to remote storage controller 30. Remote out queue selects between a request from IP0 14, IP1 16, and I/O 18. Remote out queue control 806 is coupled to IP0 14 via interface 810, IP1 16 via interface 818, and to I/O 18 via interface 820. Similarly, SEL 808 is coupled to IP0 14 via interface 812, to IP1 16 via interface 822, and to I/O 18 via interface 824. Remote out queue control 806 services the requests from IP0 14, IP1 16, and I/O 18 in a predetermined order.

When remote out queue control 806 services the request from IP0 14, remote out queue control 806 forces SEL 808 to select the write address from IP0 14 via interface 858. Remote out queue control 806 routes the request from IP0 14 to remote in queue 830 via interface 838. Similarly, SEL 808 routes the write address from IP0 14 to SEL 832 via interface 840. When the request from IP0 14 is selected and routed, remote out queue control 806 triggers an invalidate request to an invalidate out queue control block 804 via interface 854. Invalidate out queue control block 804 controls a SEL block 802 via interface 852. Invalidate out queue control 804 receives requests from IP0 14, IP1 16, and I/O 18. Invalidate out queue control 804 services these requests in a predetermined order. Invalidate out queue control 804 is fed an invalidate request from IP0 14 via interface 810, from IP1 16 via interface 814, and from I/O 18 via interface 816. Similarly, SEL 802 is fed an invalidate address from IP0 14, IP1 16 and I/O 18. Invalidate out queue control 804 routes the selected invalidate request to invalidate in queue control 828 via interface 836. SEL 802 routes the invalidate address to SEL 826 via interface 834. Invalidate out queue control 804 and SEL 802 route the invalidate request and invalidate address to all three remote storage controllers 30, 28, and 26. Similarly, remote out queue control 806 and SEL 808 route the write request and write address to all remote storage controllers 30, 28, and 26.

Invalidate in queue control 828 and SEL 826 comprise an invalidate in queue. Invalidate in queue control 828 services the invalidate requests in a predetermined order. Invalidate in queue control 828 receives invalidate requests from storage controllers 12, 26, and 28, IPA 40, IPB 42, and I/O 52. Invalidate in queue control 828 controls SEL 826 via interface 860. SEL 826 routes the invalidate address of the selected invalidate request to IPA DUP TAG 842 via interface 844. IPA DUP TAG 842 searches the IPA duplicate tag block to determine whether there is a match with the invalidate address provided by SEL 826. A further discussion on the method used for searching the IPA DUP TAG block can be found in the discussion of FIG. 6. If there is a match, a corresponding block of data in IPA 40 is invalidated. The next time IPA 40 attempts to read the invalidated block of data, IPA 40 issues a read request to remote in queue control 830 via interface 848, rather than reading the data directly from a local cache element. IPA 40 will also issue a read address to SEL 832 via interface 850. At this point, remote in queue control 830 has a write request from IP0 14 and a read request from IPA 40. However, remote in queue control 830 operates in a FIFO fashion thereby guaranteeing that the write request from IP0 14 is serviced before the read request from IPA 40. That is, IPA 40 reads the new data provided by the corresponding write thereby ensuring cache coherency within the system.

Referring back to IPA DUP TAG 842, if the invalidate address supplied by SEL 826 does not match a duplicate tag, data is not invalidated and IPA 40 may access data from its instruction cache and/or operand cache directly.

Figure 11:
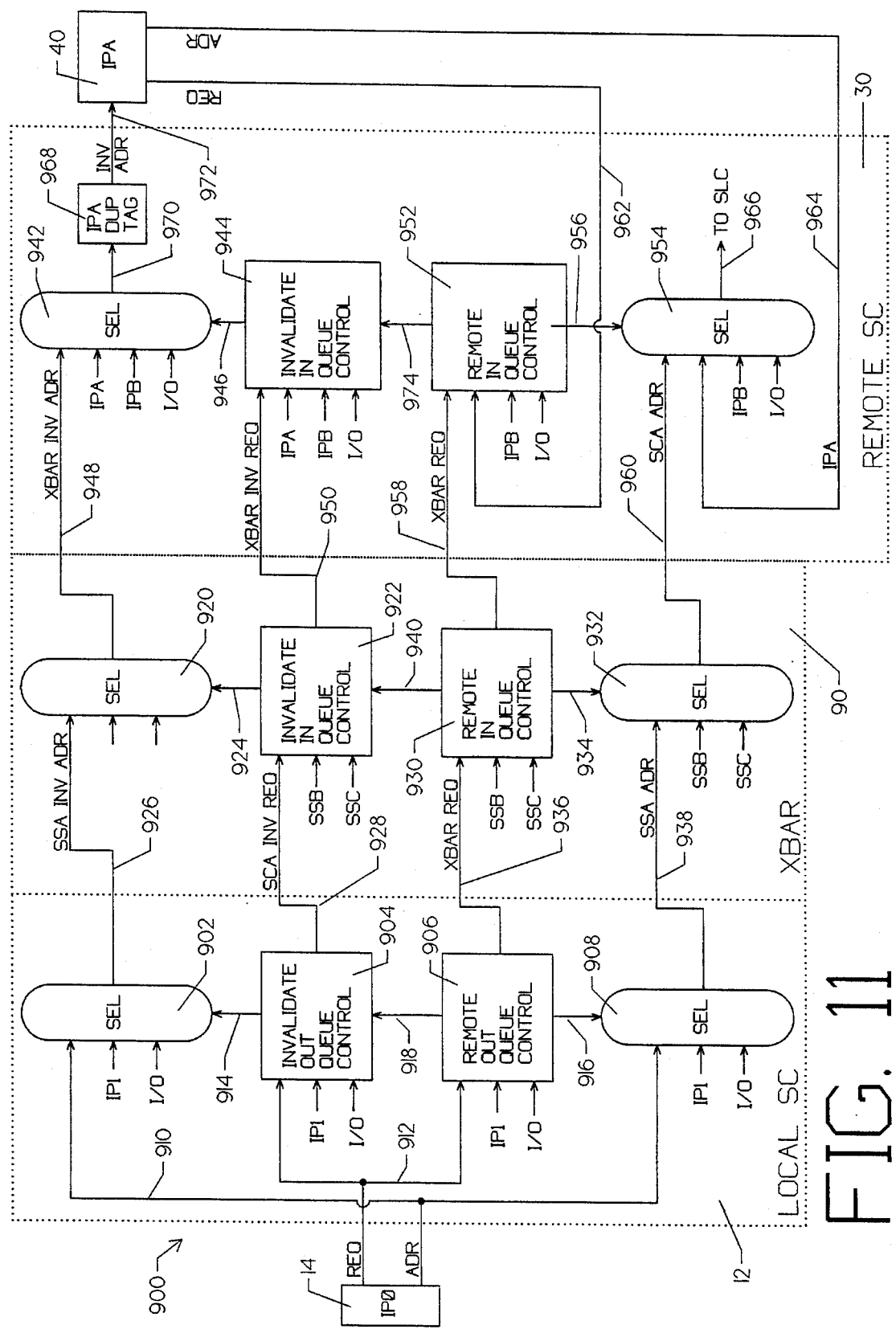
FIG. 11 is a detailed schematic diagram of a local storage controller and a remote storage controller interface utilizing the XBAR interface block in accordance with the present invention.

FIG. 11 is a detailed schematic diagram of a local storage controller and a remote storage controller interface utilizing the XBAR interface block in accordance with the present invention. With reference to FIG. 2, the exemplary embodiment shown in FIG. 11 illustrates the communication link from IP0 14 through storage controller 12, to XBAR interface block 90 via interface 82, to storage controller 30 via interface 88, and finally to IP 40. The communication path is generally shown at 900. IP0 14 may execute a store instruction to a remote memory address location. For the purposes of this discussion only, it is assumed that IP0 14 executes a store instruction to a remote memory address located in storage controller 30. The store instruction issues a write request, a write address, and write data to local storage controller 12. Local storage controller 12 may route the write request to invalidate out queue control 904 and to remote out queue control 906 via interface 912. Local storage controller 12 may route the write address to SEL 902 and SEL 908 via interface 910. Remote out queue control 906 services write requests from IP0 14, IP1 16 and I/O 18 in a predetermined order. When the write request from IP0 14 is selected via remote out queue control 906, remote out queue 906 triggers an invalidate request to invalidate out queue control 904 via interface 918 and also routes the write request to remote in queue control 930 in XBAR 90. Similarly, remote out queue control 906 controls SEL 908 via interface 916 thereby causing SEL 908 to route the write address from IP0 14 to SEL 932 via interface 938. Invalidate out queue control 904 services invalidate requests from IP0 14, IP1 16, and I/O 18. Similarly, SEL 902 may select invalidate addresses from IP0 14, IP1 16 and I/O 18 in a predetermined order. Invalidate out queue control 904 controls the selection of SEL 902 via interface 914. When the invalidate request from IP0 14 is selected by invalidate out queue control 904, the invalidate request is routed to invalidate in queue control 922 via interface 928. Further, invalidate out queue control 904 causes SEL 902 to select the invalidate address from IP0 14 and routes the invalidate address to SEL 920 via interface 926.

XBAR 90 may contain various queues to insure data coherency within the system. In the exemplary embodiment, XBAR 90 contains an invalidate in queue comprising invalidate in queue control 922 and SEL 920. Similarly, XBAR 90 contains a remote in queue comprising remote in queue control 930 and SEL 932. Remote in queue control 930 services write requests from storage controllers 12, 26, and 28 in a predetermined order. Similarly, SEL 932 may select between write address from storage controllers 12, 26 and 28. It is contemplated, however, that additional storage controllers may be serviced by XBAR 90. Remote in queue control 930 controls the selection of SEL 932 via interface 934. When the write request from storage controller 12 is selected by remote in queue control 930, the request is routed to remote in queue control 952 within remote storage controller 30 via interface 958. Further, a corresponding write address is selected by SEL 932 and routed to SEL 954 via interface 960. When a write request from storage controller 12 is serviced, remote in queue control 930 triggers an invalidate enable to invalidate in queue control 922 via interface 940. Invalidate in queue control 922 services enabled invalidate requests from storage controllers 12, 26, and 28 in a predetermined order. Similarly, SEL 920 may select between invalidate addresses from storage controllers 12, 26, and 28. Invalidate in queue control 922 controls the selection of SEL 920 via interface 924. When the invalidate request from storage controller 12 is selected by invalidate in queue control 922, the invalidate request is routed to invalidate in queue control 944 via interface 950. Invalidate in queue control 922 also forces SEL 920 to select the invalidate address from storage controller 12 and route the result to SEL 942 via interface 948.

In the exemplary embodiment, the remote in queue control 930 does not trigger an invalidate enable to invalidate in queue 922 until the write request from storage controller 12 is serviced by remote in queue control 930. Therefore, the write request from storage controller 12 is routed to remote in queue control 952 before an invalidate request is routed to invalidate in queue control 944. This ensures that the write request enters remote in queue control 952 before any read request is issued by IPA 40 as a result of a corresponding invalidate request. This in turn helps ensure data coherency within the system.

Invalidate in queue control 944 services both internal and external invalidate requests. In the exemplary embodiment, invalidate in queue control 944 may service invalidate requests from XBAR 90, IPA 40, IPB 42, and I/O 52. Similarly, SEL 942 selects invalidate addresses from XBAR 90, IPA 40, IPB 42, and I/O 52. Invalidate in queue control 944 services the invalidate requests in a predetermined order. Invalidate in queue control 944 controls SEL 942 via interface 946. When an invalidate request from XBAR 90 is selected by invalidate in queue control 944, invalidate in queue control 944 causes SEL 942 to select the invalidate address provided by XBAR 90 via interface 948. SEL 942 routes the invalidate address to IPA DUP TAG 968 via interface 970. IPA DUP TAG 968 searches the duplicate tag of IPA 40 for a match with the invalidate address provided by SEL 942. A further discussion of the method used to search IPA DUP TAG 968 may be found in the discussion of FIG. 6. If there is a match, the corresponding block of data must be invalidated within IPA 40. The next time IPA 40 reads the invalidated block of data, IPA 40 issues a read request to remote in queue control 952 via interface 962. IPA 40 also issues a read address to SEL 954 via interface 964. As previously stated, the read request from IPA 40 will arrive at remote in queue control 952 after the write request that is provided by XBAR 90 via interface 958. This helps ensures data coherency within the system. Remote in queue control 952 services memory requests from both internal and external sources. Remote in queue control 952 services request from XBAR 90, IPA 40, IPB 42, and I/O 52. Similarly, SEL 954 services requests from XBAR 90, IPA 40, IPB 42 and I/O 52. Remote in queue control 952 controls the selection of SEL 954 via interface 956. As previously stated, remote in queue control 952 operates in a FIFO fashion. Therefore, the first request received by remote in queue control 952, is the first request serviced. SEL 954 selects the memory address location to be accessed under the direction of remote in queue control 952. SEL 954 is coupled to main memory modules 64 and 66 via interface 966.

Referring back to IPA DUP TAG 968, if a match is not found between the duplicate tags of IPA 40 and the invalidate request provided by SEL 942, no data invalidation is required. Therefore, IPA 40 may continue to directly read valid data from the instruction and operand caches located therein.

In the exemplary embodiment of the present invention, the addition of queue elements 920, 922, 930, and 932 within XBAR 90 may ensure data coherency. Without these additional queue structures within XBAR 90, data coherency may not be maintained. That is, without the additional queue structures within XBAR 90, IP0 14 may execute a store instruction to a remote memory address. The store instruction may issue a write request to storage controller 12. Storage controller 12 may then route the address to SEL 902 and SEL 908. Storage controller 12 may also route the write request to invalidate out queue control 904 and remote out queue control 906. Remote out queue control 906 then may select one of three local request and routes the result to XBAR 90. When the request from IP0 14 is selected and routed to XBAR 90, remote out queue control 906 may trigger an invalidate request to invalidate out queue control 904. Invalidate out queue control 904 may then selects one of three local invalidate requests and route the result to XBAR 90. If the invalidate in queue control 922 and remote in queue control 930 operated independently, then the invalidate request from IP0 14 could be transmitted to remote storage controller 30 before the corresponding write request leaves remote in queue control 930. Invalidate in queue control 944 may then select the invalidate address and provide the result to IPA DUP TAG 968 wherein a match may be found. If a match is found, a block of data may be invalidated wherein IPA 40 may make a read request to remote in queue control 952. The read request from IPA 40 may be made to remote in queue control 952 before the corresponding write request is selected by remote in queue control 930. This would result in the lack of data coherency within the system.

In the present invention, remote in queue control 930 and invalidate in queue control 922 are not treated as independent queues thereby ensuring that a write request arrives at remote in queue control 952 before a corresponding read request from IPA 40 arrives therein.

In a system having multiple storage controllers, XBAR interface block 90 may have an invalidate in queue control element 922, SEL element 920, remote in queue control element 930, and SEL element 932 for each storage controller.

Figure 12:
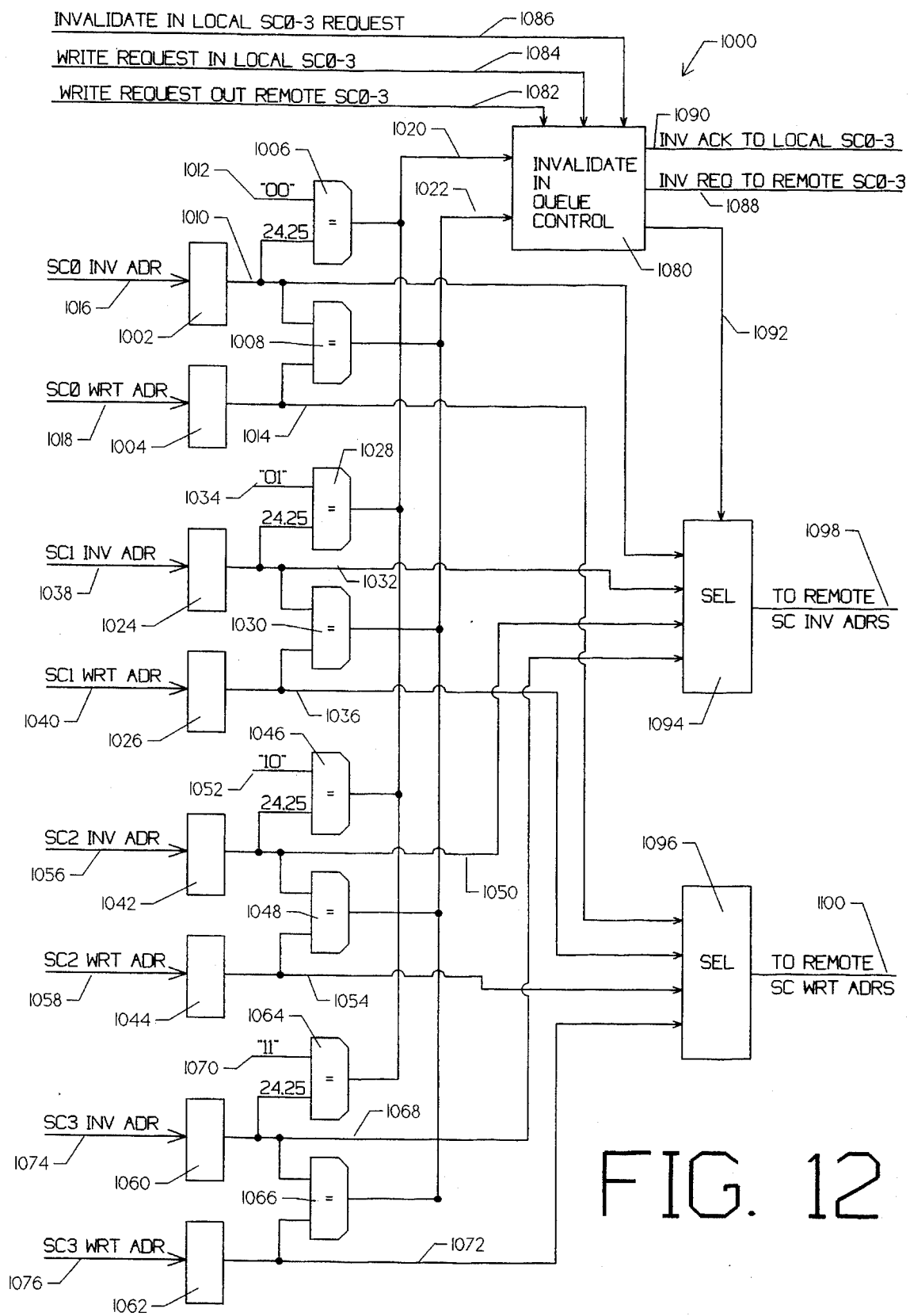
FIG. 12 is a detailed schematic diagram of the invalidate output queue controller of the XBAR interface block.

FIG. 12 is a detailed schematic diagram of the invalidate output queue controller of the XBAR interface block 90. An exemplary embodiment of the invalidate in queue control 922 is shown generally at 1000. It is contemplated that invalidate in queue control could wait until a corresponding write is complete before an invalidate request is initiated. However, this would unnecessarily slow down system performance. An exemplary embodiment contains a method of enhancing the speed of the invalidate in queue control algorithm.

For each storage controller within the system, invalidate in queue control 1080 marks a time interval that starts when invalidate in queue control 1080 receives a write request in local via interface 1084 and ends when a corresponding write request out remote is transmitted to the receiving storage controller via interface 1082. If an invalidate request is asserted during this time interval from the same interface, the invalidate request is not passed onto the remote storage controller until one of the following three events take place: (1) the write request out remote signal on interface 1082 is transmitted to the appropriate interface; (2) invalidate address bits 27–35 are not equal to the write address bits 27–35; (3) the invalidate address is for a local write as determined by the upper two address bits 24 and 25, relative to the interface number.

The first event is a guarantee that the invalidate request does not arrive at the remote storage controller before the corresponding write request. If the write request is to a remote storage controller, the local storage controller will not send an invalidate request to the XBAR until it has already sent the write request to the XBAR. XBAR 90 then delays the invalidate request via invalidate in queue control 1080 until the corresponding write request is sent to the remote storage controller. Once the remote storage controller has received the write request, the write request is entered into remote in queue control 952 which operates in a FIFO fashion. This guarantees that the invalidate request to the instructions processor and the corresponding read request to the storage controller will not bypass the write request, thereby maintaining cache coherency.

The invalidate request to XBAR 90 from a local storage controller does not have to follow the write request immediately. There are three sources for invalidate out requests from a local storage controller in the exemplary embodiment. These sources include the two instruction processors and the I/O block. It is possible that the invalidate request that is transmitted from the local storage controller to XBAR 90 does not correspond to the current write request. In that case, the invalidate request does not need to be delayed by XBAR 90. That is, the corresponding write request has already left XBAR 90 and been provided to the appropriate remote storage controller. To determine if the invalidate address needs to be delayed by XBAR interface block 90, the exemplary embodiment compares a predetermined portion of the invalidate address to a predetermined portion of the write address. The real address of the exemplary embodiment is 30 bits in length, numbered 24–53. The invalidate address is the upper 27 bits of this real address, numbered 24–50. This is primarily done because invalidates are typically done on eight word blocks. The write address is also 27 bits in length, but uses bits 27–53 of the real address. The upper three bits of the real address are decoded into individual lines indicating which storage controller and which segment within a storage controller the address is to be provided. A compare is done between bits 27–35 of the write address and bits 27–35 of the invalidate address to help accelerate invalidate requests through XBAR 90. If the 9 bits of address do not match, XBAR 90 may transmit the invalidate address to the remote storage controller without waiting for the timing window to expire. Recall that the timing window is provided by invalidate in queue control 1080 in the exemplary embodiment.

To determine if the invalidate address needs to be delayed by XBAR interface block 90 in accordance with Event (3) above, it must be determined whether the write request is to a local storage controller or a remote storage controller. If the write is to a local storage controller, then there is no write request to XBAR 90 and no need to delay the remote invalidate request. In an exemplary embodiment, the local storage controllers are designed to guarantee that the local write is executed before a corresponding read requests is executed thereby ensuring data coherency within the storage controller itself. Even if the write-request is strictly local, there may be an invalidate request that is transmitted to all other storage controllers within the system. The invalidate request may proceed to XBAR 90. In order to bypass the timing window set by XBAR 90, a comparison is made between the upper two invalidate address bits 24–25 and the interface number that the invalidate request emanated. If they are the same, then the invalidate request is for a strictly local write and the invalidate request can then be broadcast to the remote storage controllers without waiting for the timing window to expire.

Referring to FIG. 12, an exemplary embodiment has four storage controllers (SC0→SC3) coupled to XBAR 90. A register 1002 receives an invalidation address from SC0 via interface 1016. A register 1004 receives a write address from SC0 via interface 1018. Register 1002 provides the invalidation address to a comparator 1006 and a comparator 1008 via interface 1010. Register 1004 provides the write address to comparator 1008 via interface 1014. Comparator 1006 determines whether the invalidation address is for a local write as determined by the upper two address bits 24–25. If the upper two address bits 24–25 are equal to the storage controller number provided on interface 1012, comparator 1006 notifies invalidate in queue control 1080 that XBAR 90 may transmit the invalidate address to the remote storage controller via interface 1020 without waiting for the timing window to expire. Comparator 1008 compares the invalidate address provided by register 1002 and the write address provided by register 1004 and determines if they are equal. If the invalidate address is not equal to the write address, comparator 1008 notifies invalidate in queue control 1080 via interface 1022 that XBAR 90 may transmit the invalidate address to the remote storage controller without waiting for the timing window to expire.

A register 1024 receives an invalidate address from SC1 via interface 1038. A register 1026 receives a write address from SC1 via interface 1040. Register 1024 provides the invalidate address to a comparator 1028 and a comparator 1030 via interface 1032. Comparator 1028 determines whether the upper two address bits 24–25 of the invalidate address provided by register 1024 is equal to the storage controller number that is provided via interface 1034. If the upper two bits of the invalidate address provided by register 1024 are equal to the storage controller number provided via interface 1034, comparator 1028 notifies invalidate in queue control 1080 via interface 1020 that XBAR 90 may transmit the invalidate address to the remote storage controller without waiting for the timing window to expire. Register 1026 provides the write address from SC1 to comparator 1030 via interface 1036. Comparator 1030 compares the invalidate address and the write address and determines if they are equal. If the invalidate address provided by register 1024 and the write address provided by register 1026 are not equal, comparator 1030 notifies invalidate in queue control 1080 via interface 1022 that XBAR 90 may transmit the invalidate address to the remote storage controller without waiting for the timing window to expire.

A register 1042 receives an invalidate address from SC2 via interface 1056. A register 1044 receives a write address from SC2 via interface 1058. Register 1042 provides the invalidate address to a comparator 1046 and a comparator 1048 via interface 1050. Comparator 1046 compares the upper two bits of the invalidate address provided by register 1042 to a storage controller number provided on interface 1052. If comparator 1046 determines that the upper two bits of the invalidate address provided by register 1042 are equal to the storage controller number provided via interface 1052, comparator 1046 notifies invalidate in queue control 1080 via interface 1020 that XBAR 90 may transmit the invalidate address provided by register 1042 to the remote storage controller without waiting for the time window to expire. Register 1044 provides a write address to comparator 1048 via interface 1054. Comparator 1048 determines whether the invalidate address provided by address 1042 and the write address provided by register 1044 are equal. If the invalidate address provided by register 1042 is not equal to the write address provided by register 1044, comparator 1048 notifies invalidate in queue control 1080 via interface 1022 that XBAR 90 may transmit the invalidate address to the remote storage controller without waiting for the time window to expire.

Finally, a register 1060 receives an invalidate address from SC3 from interface 1074. A register 1062 receives a write address from SC3 via interface 1076. Register 1060 provides the invalidate address to a comparator 1064 and a comparator 1066 via interface 1068. Comparator 1064 compares the upper two bits of the invalidate address provided by address 1060 to the storage controller number provided on interface 1070. If comparator 1064 determines that the upper two bits of invalidate address provided by register 1060 are equal to the storage controller number provided in interface 1070, comparator 1064 notifies invalidate in queue control 1080 via interface 1020 that XBAR 90 may transmit the invalidate address to the remote storage controller without waiting for the timing window to expire. Register 1062 provides a write address to comparator 1066 via interface 1072. Comparator 1066 compares the invalidate address provided by register 1060 and the write address provided by register 1062. If the invalidate address provided by register 1060 is not equal to the write address provided by register 1062, comparator 1066 notifies invalidate in queue control 1080 via interface 1022 that XBAR 90 may transmit the invalidate address to the remote storage controller without waiting for the timing window to expire.

The invalidate address contained in registers 1002, 1024, 1042 and 1060 are provided to SEL 1094 via interfaces 1010, 1032, 1050 and 1068, respectively. SEL 1094 is controlled by invalidate in queue control 1080 via interface 1092. SEL 1094 selects between the invalidate addresses provided by SC(0-3) and provides the result to a remote storage controller via interface 1098. SEL 1096 receives the write addresses contained in registers 1004, 1026, 1044, and 1062 via interfaces 1014, 1036, 1054 and 1072, respectively. SEL 1096 selects one of the write addresses provided by SC(0-3) and provides the result to a remote storage controller via interface 1100.

Invalidate in queue control 1080 provides an invalidate acknowledge to an appropriate local storage controller via interface 1090. Invalidate in queue control 1080 also provides an invalidate request to an appropriate remote storage controller via interface 1088.

Figure 13:
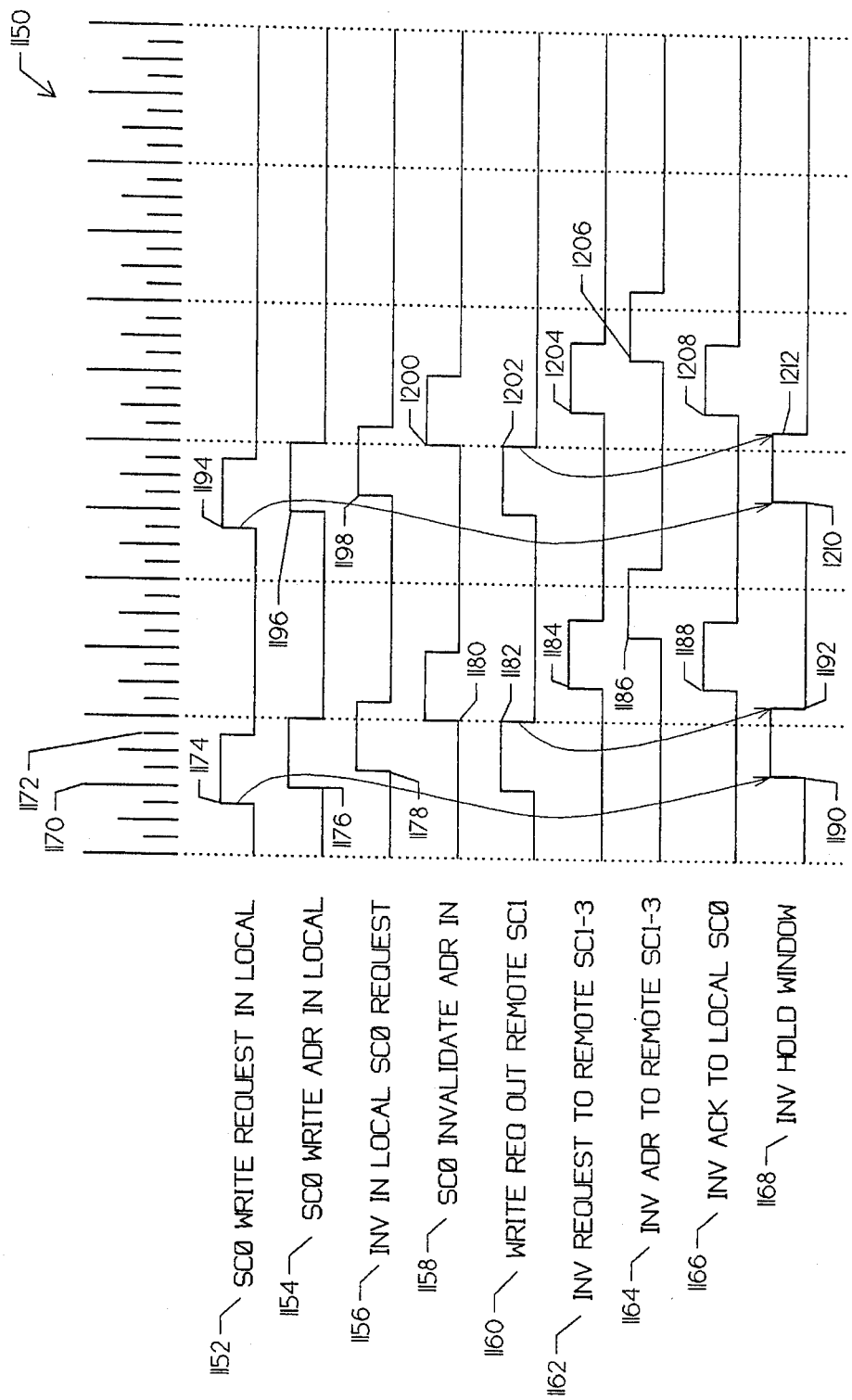
FIG. 13 is a timing diagram of the operation of the XBAR invalidate scheme with no delay.

FIG. 13 is a timing diagram of the operation of the XBAR invalidate scheme with minimum delay. The timing diagram is generally shown at 1150. Each large tick mark as shown at 1170 is a major system cycle which comprises four clock phases. Each small tick mark as shown 1172 is a clock phase equal to one-fourth of the major system cycle.

In the exemplary embodiment, storage controller-0 (SC0) may issue a write request to a remote storage controller via the XBAR 90. SC0 write request in local 1152 shows a write request from local SC0 captured by XBAR interface 90 at 1174. One clock phase later, a write address is captured from local SC0 by XBAR 90 as shown as SC0 write ADR in local 1154 at 1176. One clock phase later, an invalidate request from local storage controller SC0 is captured by XBAR 90 at 1178. Since the local write request at 1174 occurs before the corresponding local invalidate request at 1178, XBAR 90 guarantees that cache coherency is maintained by retaining this timing relationship. A local invalidate address is captured by XBAR 90 at 1180.

If there is no queue wait at remote in queue control 930 (see, FIG. 11), the XBAR issues a write request to a selected storage controller as shown at 1182. In the exemplary embodiment, this occurs one clock phase after the local write request as shown at 1174. The invalidate request to the remote storage controllers 1162 and 1184 occurs after the write request has been transmitted as shown at 1182. Following the invalidate request to the remote storage controllers, an invalidate address 1164 may be provided to the remote storage controllers as shown at 1186. Invalidate in queue control 1080 (see FIG. 12) may provide an invalidate acknowledge 1166 to the local storage controller issuing the write request as shown at 1188.

Invalidate in queue control 1080 may generate an invalidate hold window as shown at 1168. The invalidate hold window may start when it receives a write request in local signal 1174 as shown at 1190. The invalidate hold window may end when the corresponding write request out remote signal 1182 is transmitted to the remote storage controller as shown at 1192. In the exemplary embodiment shown in FIG. 13, the invalidate request as shown at 1184 does not occur within the invalidate hold window 1168, and therefore XBAR 90 may transmit the invalidate address to the remote SC without waiting for the timing window to expire.

Another write request is shown with pulses 1194, 1196, 1198, 1200, 1202, 1204, 1206, 1208, and 1210, and may operate in a similar manner as described above.

Figure 14:
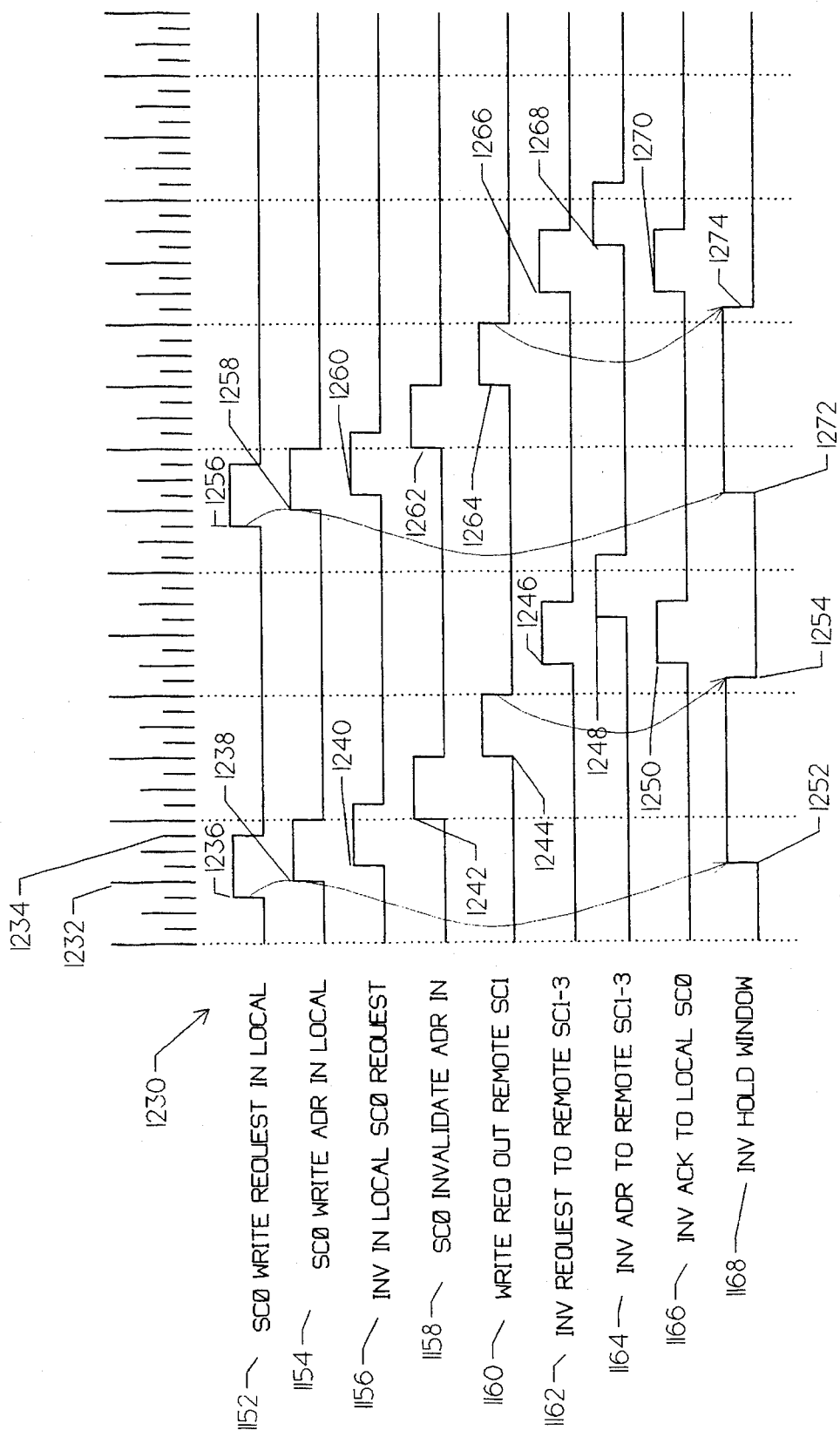
FIG. 14 is a timing diagram of the operation of the XBAR invalidate scheme with a two major cycle delay.

FIG. 14 is a timing diagram of the operation of the XBAR invalidate scheme with a two major cycle delay in the XBAR remote in queue control 930 (see FIG. 11). The timing diagram is generally shown at 1230. As in FIG. 13, a local storage controller may issue a write request viz XBAR 90 to a remote SC. As shown at 1152, storage controller-0 (SC0) issues a write request which is captured by XBAR 90 at 1236. One clock phase later, XBAR 90 captures a write address as shown at 1238. One clock phase later, XBAR 90 captures an invalidate request from SC0 as shown at 1240. Finally, XBAR 90 captures an invalidate address from SC0 as shown at 1242. In the exemplary embodiment, the design of storage controllers 12, 26, 28, and 30 are such that the local write request is distributed and therefore serviced before a local invalidate request. This ensures data coherency within the storage controller itself.

If the write request is to a remote storage controller, SC0 may issue a remote write request which is captured by XBAR 90 as shown at 1244. As described in FIG. 13, invalidate in queue control 1080 (see FIG. 12) creates an invalidate hold window which may begin when invalidate in queue 1080 receives a write request in local signal 1152 as shown at 1252. The invalidate hold window may end when the corresponding write request out remote signal 1160 is transmitted to the remote storage controller as shown at 1254. Therefore, in the exemplary embodiment, the invalidate hold window extends from point 1252 to point 1254. Invalidate in queue control 1080 prevents an invalidate request from being passed out of XBAR 90 to a remote storage controllers until: (1) the write request out remote signal 1160 has been transmitted to the appropriate interface; (2) the invalidate address bits 27–35 are not equal to the write address bits 27–35; (3) the invalidate address is for a local write as determined by the upper two address bits 24–25 relative to the interface number. In the case shown in FIG. 14, only (1) applies. That is, the invalidate hold window ends one phase after write request out remote 1160 is transmitted to the remote storage controller as shown at 1254. Therefore, the invalidate request to the remote storage controller as shown at 1246 is delayed until after the invalidate hold window expires. The invalidate address to the remote storage controllers occurs after the invalidate request is provided to the remote storage controllers as shown at 1248. Invalidate in queue control 1080 provides an invalidate acknowledge signal to the local storage controller as shown at 1250.

Another write request is shown via pulses 1256, 1258, 1260, 1262, 1264, 1266, 1268, 1270 and 1274 and operates in a similar manner as described above.

The case shown in FIG. 14 illustrates that the invalidate request to the remote storage controllers as shown at 1246 is delayed by two major system clock cycles from the case shown in FIG. 13. This delay illustrates how XBAR 90 maintains data coherency within the system. The length of the delay is dependent upon various factors as described above.

Figure 15:
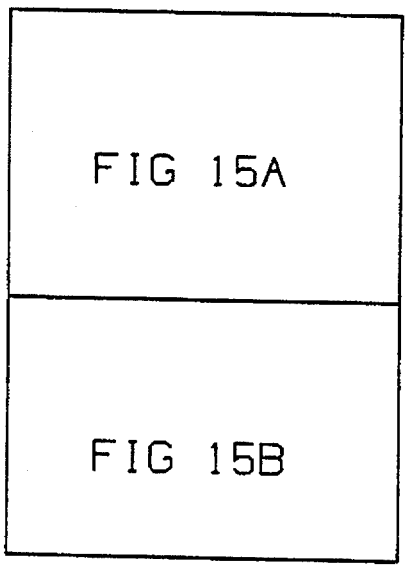
FIG. 15A and FIG. 15B are a flow diagram illustrating the operation of an exemplary embodiment of the present invention.
Figure 15B:
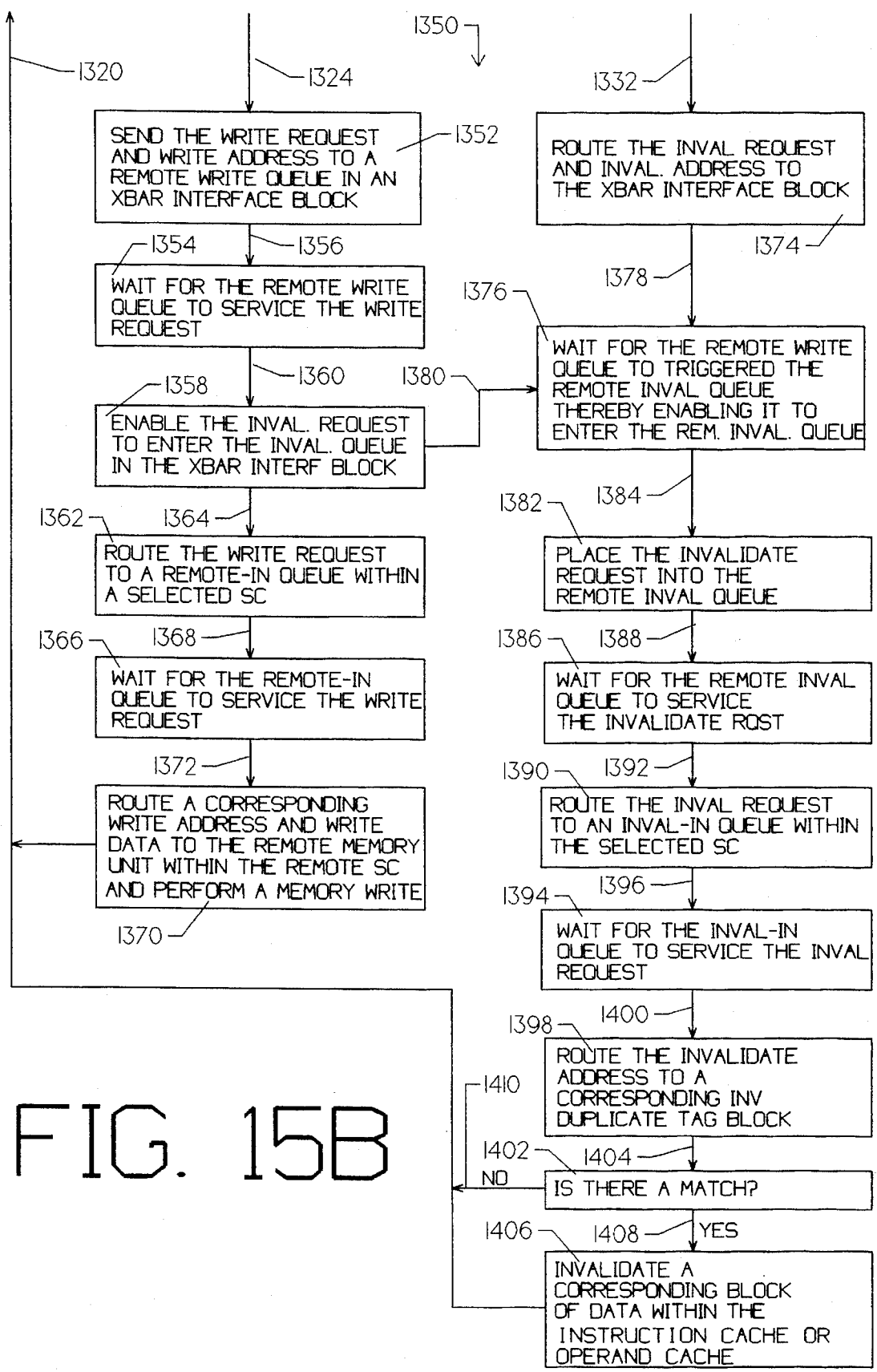

FIG. 15A and FIG. 15B are a flow diagram illustrating the operation of an exemplary embodiment of the present invention. The flow diagram is generally shown at 1300. The algorithm is entered at element 1302 and control is passed to element 1304 via interface 1306. Element 1304 waits for a storage controller to issue a write request. Referring to FIG. 2, storage controllers 12, 26, 28, or 30 may issue the write request. The write request may emanate from a corresponding instruction processor or I/O element. Once a write request is issued by a storage controller, control is passed to element 1308 via interface 1310. For this discussion, it is assumed that storage controller 12 has issued the write request. However, it is recognized that any of the storage controllers within the system may issue a write request in a similar manner. Element 1308 captures the local write request in a write queue located in storage controller 12. Control is then passed to element 1312 via interface 1314. Element 1312 waits for the local write queue located in storage controller 12 to serve the local write request. Once the write queue services the local write request, control is passed to element 1315 via interface 1317. Element 1315 determines whether the write request is to the local storage controller or a remote storage controller. If the write request is to the local storage controller, control is passed to element 1316 via interface 1318. Element 1316 routes a corresponding write address and corresponding write data to the local memory unit and performs a memory write. Control is then passed back to element 1304 via interface 1320.

Referring back to element 1315, if the write request is to the local storage controller, control is also passed to element 1322 via interface 1318. Element 1322 places an invalidate request into an invalidate queue located within storage controller 12. Control is then passed to element 1326 via interface 1328. Element 1326 waits for the invalidate queue to service the invalidate request. Once the invalidate queue located in storage controller 12 services the invalidate request, control is passed to element 1330 via interface 1332. Element 1330 routes the invalidate address to a corresponding invalidate duplicate tag block located within storage controller 12. Control is then passed to element 1334 via interface 1336. Element 1334 determines whether there is a match between the invalidate address and the duplicate tag block. If there is a match between the invalidate address and the duplicate tag block, control is passed to element 1338 via interface 1340. Element 1338 invalidates a corresponding block of data within the instruction cache or operand cache of instruction processor 14 or 16. Control is then passed back to element 1304 via interface 1320. Referring back to element 1334, if there is not a match between the invalidate address and the duplicate tag block, control is passed back to element 1304 via interface 1342. In this case, no data is invalidated and the local instruction processor or I/O element may directly access the local cache data.

Referring back to element 1315, if the write request is to a remote storage controller, control is passed to both element 1322 and element 1352 via interface 1324. Element 1322 through element 1338 operates in a similar manner as described in the previous paragraphs. That is, even when the write request is to a remote storage controller, an invalidate request is processed in the local storage controller to determine if the local instruction processor contains a copy of the data block to be written by the corresponding write request.

Referring to FIG. 15B, element 1352 sends the local write request and local write address to a remote write queue located in XBAR interface block 90. Control is then passed to element 1354 via interface 1356. Element 1354 waits for the remote write queue located in XBAR interface block 90 to service the write request. Once the remote write queue located in XBAR interface block 90 services the write request, control is passed to element 1358 via interface 1360. Element 1358 allows an invalidate request to enter an invalidate queue located in XBAR interface block 90. The operation of element 1358 will become apparent later. Control is then passed to element 1362 via interface 1364. Element 1362 routes the write request and a corresponding write address to a remote-in queue within a selected storage controller. Control is then passed to element 1366 via interface 1368. Element 1366 waits for the remote-in queue to service the write request. Once the remote-in queue services the write request, control is passed to element 1370 via interface 1372. Element 1370 routes a corresponding write address and a corresponding write data to a memory unit within the remote storage controller and performs a memory write. Control is then passed back to element 1304 via interface 1320.

Referring back to element 1326, once the invalidate queue, located in the local storage controller, services the local invalidate request, control is passed to element 1374 via interface 1332. Element 1374 routes the invalidate request and an invalidate address to XBAR interface block 90. Control is then passed to element 1376 via interface 1378. Element 1376 waits for the remote write queue located in XBAR interface block 90 to trigger the remote invalidate queue, which is also located in XBAR interface block 90, thereby enabling the invalidate request to enter the remote invalidate queue. The remote write queue triggers the remote invalidate queue via interface 1380. Element 1376 ensures that the write request arrives in the remote storage controller and serviced thereby before the invalidate request. Control is then passed to element 1382 via interface 1384. Element 1382 places the invalidate request into the remote invalidate queue. Control is then passed to element 1386 via element 1388. Element 1386 waits for the remote invalidate queue located in XBAR interface block 90 to service the invalidate request. Once the remote invalidate queue services the invalidate request, control is passed to element 1390 via interface 1392. Element 1390 routes the invalidate request to an invalidate-in queue within the selected storage controller. Control is then passed to element 1394 via interface 1396. Element 1394 waits for the invalidate-in queue to service the invalidate request. Once the invalidate-in queue located in the remote storage controller services the invalidate request, control is passed to element 1398 via interface 1400. Element 1398 routes the invalidate request to a corresponding invalidate duplicate tag block. Control is then passed to element 1402 via interface 1404. Element 1402 determines whether there is a match between the invalidate address and the corresponding invalidate duplicate tag block. If there is a match between the invalidate address and the invalidate duplicate tag block, control is passed to element 1406 via interface 1408. Element 1406 invalidates a corresponding block of data within the appropriate instruction cache or operand cache within the instruction processor. Any subsequent attempt to access the invalidated data will be blocked, thereby forcing an access to the storage controller. Control is then passed back to element 1304 via interface 1320. Referring back to element 1402, if there is not a match between the invalidate address and the corresponding invalidate duplicate tag block, control is passed back to element 1304 via interface 1410.

Figure 16:
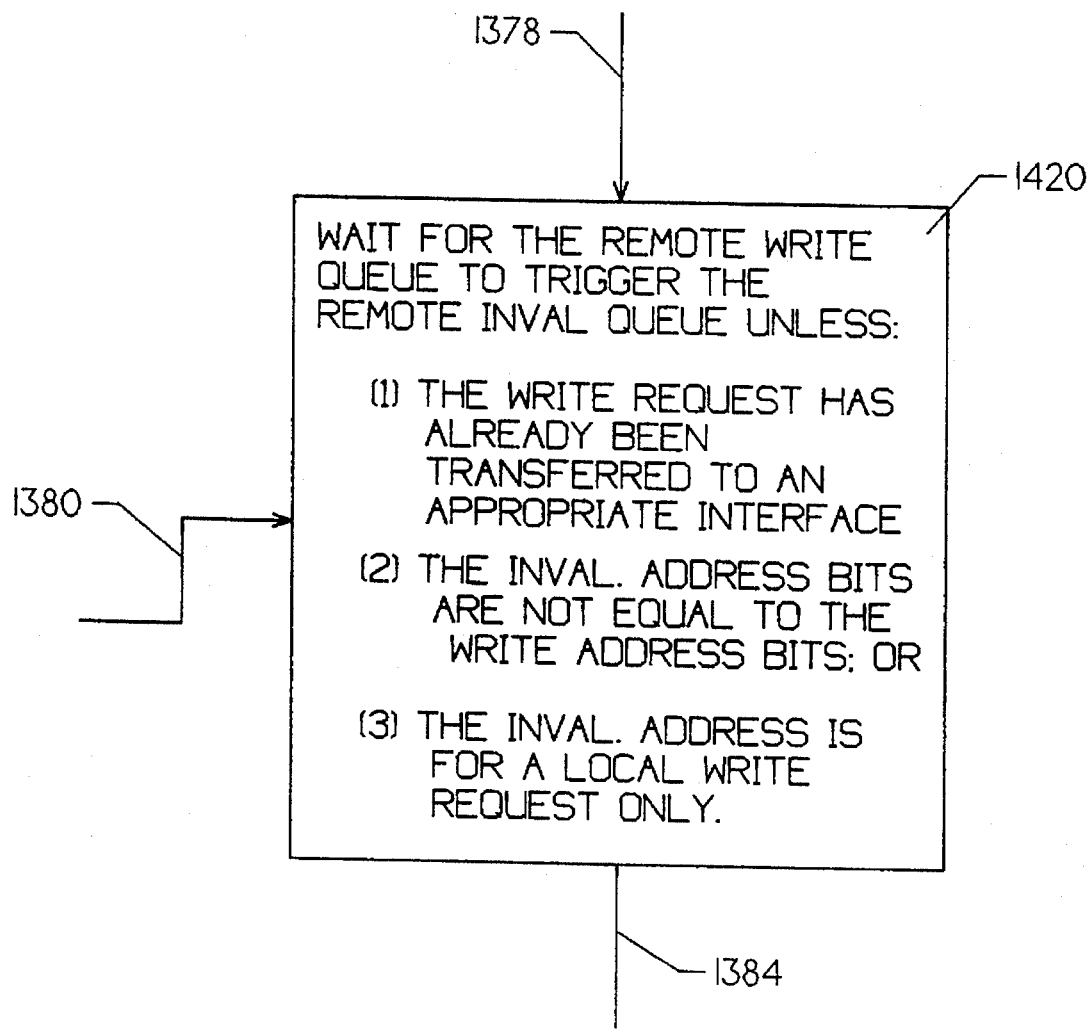
FIG. 16 illustrates an alternative embodiment to element 1376 of FIG. 15B.

FIG. 16 illustrates an alternative embodiment to element 1376 of FIG. 15B. This alternative embodiment may increase the overall speed of a system by not delaying the remote invalidate request under certain circumstances. The alternative embodiment is shown at 1420. Element 1420 waits for the remote write queue located in XBAR interface block 90 to trigger the remote invalidate queue unless or until: (1) the write request has already been transferred to an appropriate interface; (2) the invalidate address bits are not equal to the write address bits, thereby indicating that the write request has been transferred ahead of the invalidate request; (3) the invalidate address is for a local write request only. This filter mechanism may increase the speed of a given system by reducing the time an invalidate request is delayed under certain circumstances.

Figure 17A:
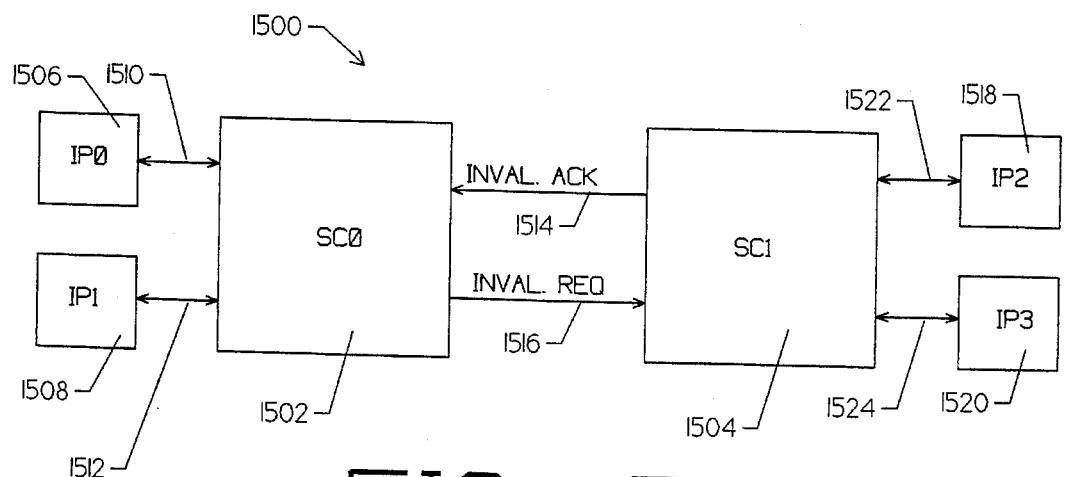
FIG. 17A is a schematic diagram of an essentially point-to-point architecture showing the invalidate request and invalidate acknowledge signals.

FIG. 17A is a schematic diagram of an essentially point-to-point architecture scheme showing the invalidate request and invalidate acknowledge signals. The exemplary embodiment is shown generally at 1500. A first storage controller 1502 is coupled to instruction processor 1506 and instruction processor 1508 via interfaces 1510 and 1512, respectively. A second storage controller 1504 is coupled to an instruction processor 1518 and an instruction processor 1520 via interfaces 1522 and 1524, respectively. Storage controller 1502 and storage controller 1504 may be coupled together in an essentially point-to-point architecture generally as shown in FIG. 1 and discussed with reference thereto.

In the exemplary embodiment, storage controller 1502 may issue a write request to a memory location. In conjunction therewith, storage controller 1502 may also issue an invalidate request to all other storage controllers. That is, storage controller 1502 may inform all other storage controllers that a block of data is being updated. If instruction processors 1518 and 1520 have a copy of the data that is being updated by storage controller 1502, instruction processors 1518 and 1520 must get an updated copy of the data to insure data coherency within the system. The data coherency scheme used in the exemplary embodiment is discussed above.

In the exemplary embodiment, storage controller 1502 provides an invalidate request to all other storage controllers. That is, storage controller 1502 provides an invalidate request to storage controller 1504 via interface 1516. In response thereto, storage controller 1504 may provide an invalidate acknowledge signal back to the requesting storage controller 1502 via interface 1514, indicating that storage controller 1504 knows about the data change. In the exemplary embodiment, the requesting storage controller 1502 is not allowed to perform a subsequent write operation until storage controller 1504 has responded to the invalidate request by returning an invalidate acknowledge signal.

It is contemplated that a number of storage controllers may be included in a system. It is further contemplated that the requesting storage controller 1502 may provide an invalidate request to all of the storage controllers. Finally, as stated above, it is contemplated that the requesting storage controller 1502 may not be allowed to perform a subsequent write operation until all of the storage controllers have responded to the invalidate request signal by returning an invalidate acknowledge signal.

Figure 17B:
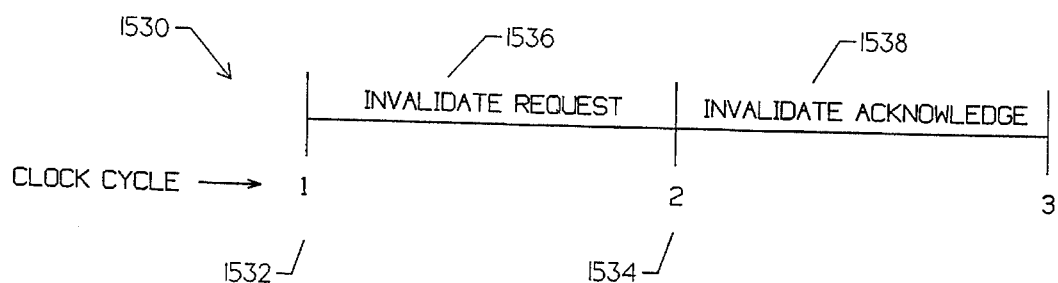
FIG. 17B is a timing diagram showing the invalidate timing for the embodiment shown in FIG. 17A.

FIG. 17B is a timing diagram showing the invalidate timing for the embodiment shown in FIG. 17A. The timing diagram is shown generally at 1530. During a first clock cycle 1532, storage controller 1502 may issue an invalidate request 1536 in response to a local or remote write operation. Storage controller 1504 may receive the invalidate request 1536 during the first clock cycle 1532. During a second clock cycle 1534, storage controller 1504 may provide an invalidate acknowledge signal 1538 back to storage controller 1502. As stated above, it is contemplated that a number of storage controllers may be provided in a partition. It is further contemplated that storage controller 1502 may provide the invalidate request 1536 to all of the storage controllers within the partition. Similarly, it is contemplated that all storage controllers within the partition may each provide an invalidate acknowledge signal 1538 back to storage controller 1502.

Figure 18A:
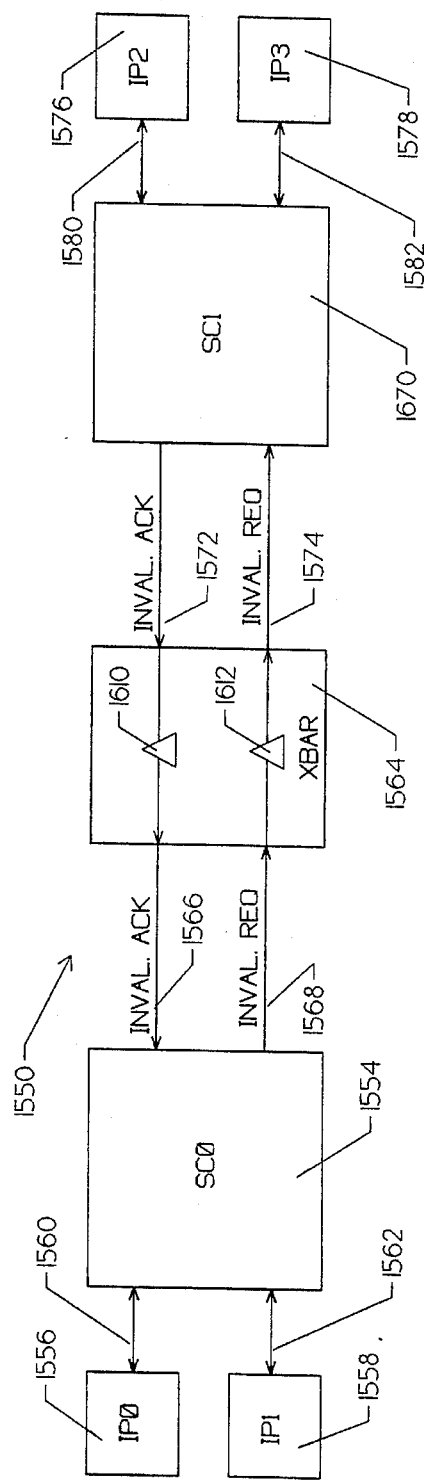
FIG. 18A is a schematic diagram of a system utilizing the XBAR interface block showing the invalidate request and invalidate acknowledge signals.

FIG. 18A is a schematic diagram of a system utilizing the XBAR interface block showing the invalidate request and invalidate acknowledge signals. The schematic diagram is generally shown at 1550. A first storage controller 1554 is coupled to an instruction processor 1556 and an instruction processor 1558 via interfaces 1560 and 1562, respectively. A second storage controller 1670 is coupled to an instruction processor 1576 and an instruction processor 1578 via interfaces 1580 and 1582, respectively. Storage controller 1554 may be coupled to XBAR interface block 1564 in accordance with FIGS. 2–16 and the discussion relating thereto. Similarly, storage controller 1670 may be coupled to XBAR interface block 1564 in accordance with FIGS. 2–16 and the discussion relating thereto.

In the exemplary embodiment, storage controller 1554 may provide an invalidate request to XBAR interface block 1564 via interface 1568 whenever storage controller 1554 performs a local or remote write operation. XBAR interface block 1564 delays the invalidate request via a delta block 1612. Delta block 1612 may comprise an invalidate in queue as discussed above. The invalidate in queue may only delay the invalidate request by one clock cycle under most conditions. XBAR interface block 1564 then may provide an invalidate request to storage controller 1670 via interface 1574. Storage controller 1670 may then provide an invalidate acknowledge signal back to XBAR interface block 1564 via interface 1572. XBAR interface block 1564 may register or otherwise delay the invalidate acknowledge signal via delta 1610. It is contemplated that delta 1610 may comprise a register or an invalidate acknowledge queue. XBAR interface block 1564 may then provide the invalidate acknowledge signal to storage controller 1554 via interface 1566.

Figure 18B:
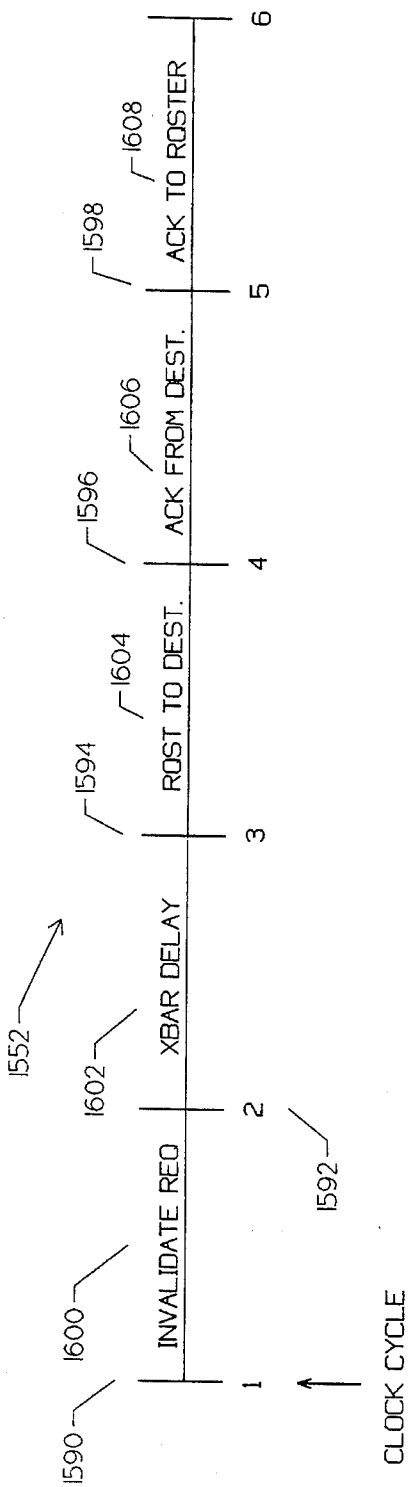
FIG. 18B is a timing diagram showing the invalidate timing for the embodiment shown in FIG. 18A.

FIG. 18B is a timing diagram showing the invalidate timing for the embodiment shown in FIG. 18A. The timing diagram is generally shown at 1552. During a first clock cycle 1590, storage controller 1554 may provide an invalidate request 1600 to XBAR interface block 1564. During a second clock cycle 1592, XBAR interface block 1564 may delay the invalidate request via delta 1612. During a third clock cycle 1594, XBAR interface block 1564 may provide the invalidate request to storage controller 1670. During a fourth clock cycle 1596, storage controller 1670 may provide an invalidate acknowledge signal to XBAR interface block 1564. During a fifth clock cycle 1598, XBAR interface block 1564 may provide the invalidate acknowledge to storage controller 1554.

In the essentially point-to-point architecture shown in FIG. 17A, the requesting storage controller may receive all of the invalidate acknowledge signals directly from the remote storage controllers. In the exemplary embodiment, this may occur on the next subsequent clock cycle after the requesting storage controller issues an invalidate request. However, when using the XBAR interface block as described above, the invalidate request/acknowledge path may become three clock cycles longer than the essentially point-to-point architecture. That is, the requesting storage controller may have to wait three additional clock cycles before a subsequent write operation can be performed. The additional three-cycle increase in the invalidate path may impact system performance.

FIG. 19A is a schematic diagram of a system utilizing the XBAR interface block showing the anticipatory acknowledge signal of the present invention. The schematic diagram is generally shown at 1620. A first storage controller 1624 is coupled to an instruction processor 1626 and an instruction processor 1628 via interfaces 1630 and 1632, respectively. A second storage controller 1648 is coupled to an instruction processor 1650 and an instruction processor 1652 via interfaces 1654 and 1656, respectively. Storage controller 1624 may be coupled to XBAR interface block 1634 in accordance with FIGS. 2–16 and the discussion relating thereto. Similarly, storage controller 1648 may be coupled to XBAR interface block 1634 in accordance with FIGS. 2–16 and the discussion relating thereto.

Storage controller 1624 may issue an invalidate request to XBAR interface block 1634 via interface 1636 in response to a local or remote write operation. As in FIG. 18, XBAR interface block 1634 may then delay the invalidate request via delta 1638. It is contemplated that delta 1638 may comprise an invalidate request in queue or any other delay means including a register. Immediately thereafter, XBAR interface block 1634 may provide an anticipatory acknowledge signal back to storage controller 1624 via interfaces 1642 and 1640. That is, storage controller 1624 may continue performing subsequent write operations once the anticipatory acknowledge signal is provided thereto. Concurrent therewith, XBAR interface block 1634 may provide an invalidate request to storage controller 1648 via interface 1646.

Storage controller 1648 may then provide an invalidate acknowledge signal back to XBAR interface block 1634 via interface 1644. XBAR interface block 1634 may then monitor the invalidate acknowledge signal from storage controller 1648 to insure that storage controller 1648 responds accordingly. If storage controller 1648 does not properly respond, XBAR interface block 1634 may issue an error and initiates an error recovery routine. That is, XBAR interface block 1634 interrupts storage controller 1624 and forces an error recovery operation. Various error recovery routines are known in the art and are not the subject of the present invention. This configuration allows the requesting storage controller 1624 to begin performing subsequent write operations before storage controller 1648 has provided an invalidate acknowledge thereto.

As stated above, it is contemplated that a number of storage controllers may be coupled to the XBAR interface block. Consistent therewith, XBAR interface block 1634 may provide the invalidate request to all of the storage controllers coupled thereto. XBAR interface block may then monitor each of the invalidate acknowledge signals provided by the number of storage controllers to ensure that all of the storage controllers respond properly. If a predetermined number of the storage controllers does not respond properly, XBAR interface block 1634 may issue an error and initiate an error recovery routine. In a preferred embodiment, all of the storage controllers must properly respond to avoid initiating the error recovery routine.

FIG. 19B is a timing diagram showing the invalidate timing for the embodiment shown in FIG. 19A. The timing diagram is shown generally at 1622. During a first clock cycle 1660, storage controller 1624 may provide an invalidate request 1668 to XBAR interface block 1634 in response to a write operation. During a second clock cycle 1662, XBAR interface block 1634 may delay the invalidate request via delta 1638. As stated above, it is contemplated that delta 1638 may comprise an invalidate in queue, register, or other storing means. During a third clock cycle 1664, XBAR interface block 1634 may provide an anticipatory acknowledge signal back to storage controller 1624 and further provide the invalidate request to storage controller 1648. At this time, storage controller 1624 may begin performing subsequent write operations. During a fourth clock cycle 1666, storage controller 1648 may provide an invalidate acknowledge signal back to XBAR interface block 1634. XBAR interface block 1634 may then check to insure the invalidate acknowledge has been provided by storage controller 1648. If the invalidate acknowledge signal has not been provided by storage controller 1648, XBAR interface block 1634 may issue an error and initiate an error recovery algorithm.

The embodiment shown in FIG. 19A allows storage controller 1624 to begin performing subsequent write operations two full clock cycles before the embodiment shown in FIG. 18A. That is, the anticipatory scheme removes two of the three delay cycles introduced by the XBAR architecture. The remaining one cycle delay may not impact overall system performance because the one additional cycle may overlap the write-request processing. Therefore, the anticipatory scheme may enhance the performance of the XBAR architecture.

In a preferred mode, the invalidate acknowledge signal from remote storage controller 1648 will always be returned in a predetermined number of clock cycles. That is, storage controller 1648 may provide the invalidate acknowledge signal back to XBAR interface block 1634 in a predetermined number of clock cycles after receiving the invalidate request from XBAR interface block 1634. In the exemplary embodiment shown in FIG. 19A, XBAR interface block 1634 may check the status of the invalidate acknowledge signal two clock cycles after the invalidate request is sent to storage controller 1648.

It is recognized, however, that an invalidate in queue within XBAR interface block 1634 may shift this timing. That is, an invalidate in queue 1638 may delay the invalidate request more than one clock cycle as is shown in FIG. 19B. In this case, storage controller 1648 may not provide an invalidate acknowledge back to XBAR interface block 1634 within four clock cycles as shown in FIG. 19B.

The exemplary embodiment of XBAR interface block 1634 keeps track of relative timing of the invalidate acknowledge signal. That is, additional hardware within XBAR interface block 1634 may detect when the invalidate request is delayed by invalidate in queue 1638, thereby delaying the monitoring of the invalidate acknowledge signals from storage controller 1648 by an appropriate length of time.

FIG. 20 is a schematic diagram showing an embodiment of the remote invalidate acknowledge monitoring hardware within the XBAR interface block. The hardware is generally shown at 1700. The embodiment shown in FIG. 20 assumes the XBAR interface block is coupled to four storage controllers. The invalidate acknowledge signals from the three destination storage controllers and a simulated acknowledge from the source storage controller are coupled to a NAND gate 1702 via interfaces 1704, 1706, 1708, and 1710, respectively. The output of NAND gate 1702 is coupled to a register 1712 via interface 1714. The clock input of register 1712 is coupled to an ack-en signal 1716. In an exemplary embodiment, ack-en signal 1716 is triggered two clock cycles after the XBAR broadcasts the invalidate requests to the remote storage controllers. If all of the invalidate acknowledge signals from the storage controllers are activated, NAND gate 1702 provides a logic zero to the data input of register 1712. The result is a logic-0 on an ERROR interface 1718 indicating no error condition exists. If, on the other hand, all of the invalidate acknowledge signals from the storage controllers are not activated, NAND gate 1702 provides a logic-1 to the data input of register 1712. The result is that a logic-1 is provided on ERROR interface 1718 indicating an error condition.

It is recognized that FIG. 20 illustrates only an exemplary embodiment and other implementations are contemplated.

Figure 21:
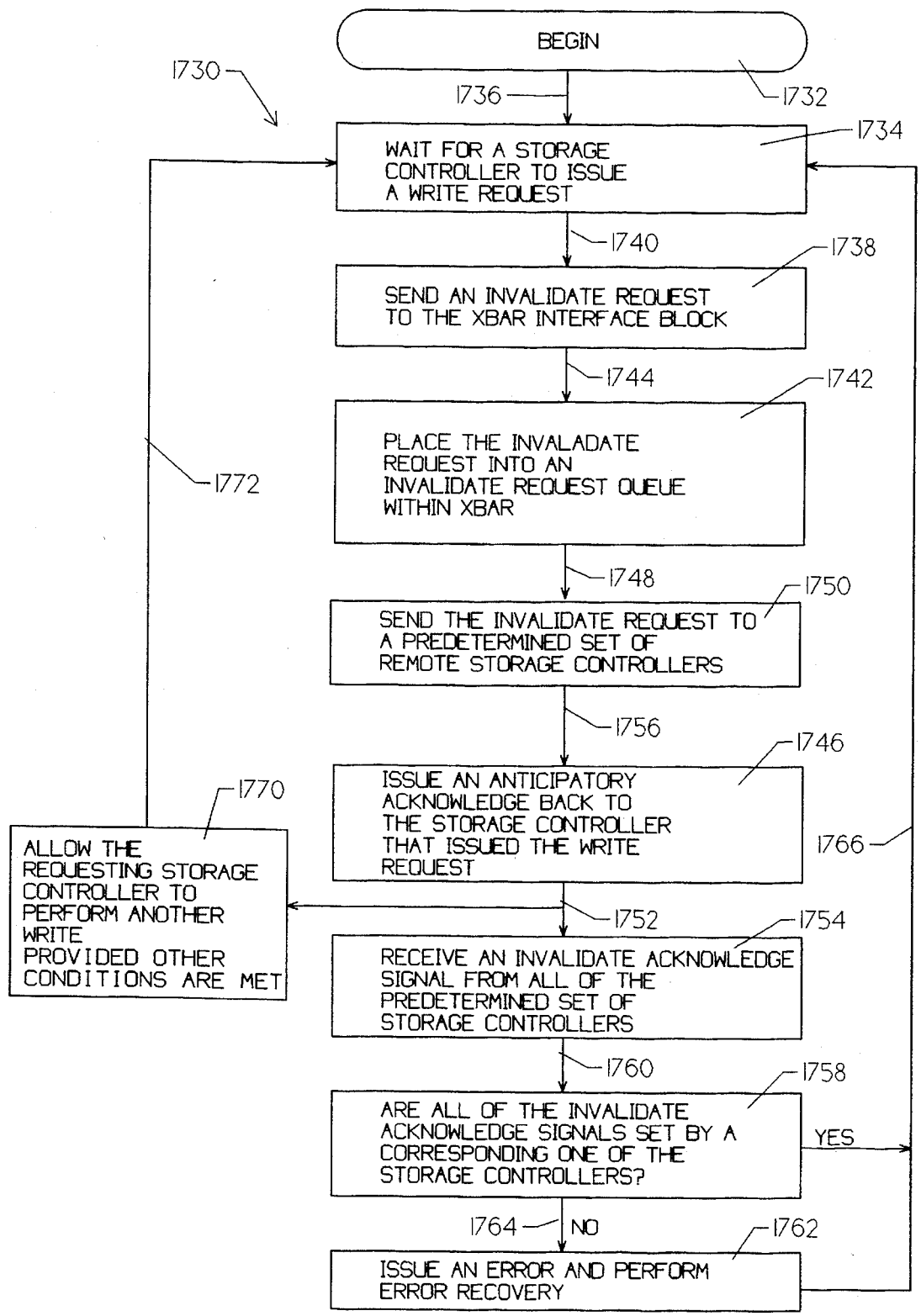
FIG. 21 is a flow diagram illustrating the operation of an exemplary embodiment of the present invention.

FIG. 21 is a flow diagram illustrating the operation of an exemplary embodiment of the present invention. The flow diagram is generally shown at 1730. The algorithm is entered at element 1732. Control is passed to element 1734 via interface 1736. Element 1734 waits for a storage controller to issue a local or remote write request. Once a storage controller issues a write request, control is passed to element 1738 via interface 1740. Element 1738 sends an invalidate request to the XBAR interface block. Control is then passed to element 1742 via interface 1744. Element 1742 places the invalidate request into an invalidate request queue within the XBAR interface block. It is contemplated that element 1742 may place the invalidate request into a register or other storage means rather than an invalidate request queue. Control is then passed to element 1750 via interface 1748. Element 1750 sends the invalidate request to a predetermined set of remote storage controllers. Concurrent with the invalidate request signal being sent to the destination storage controllers, control is passed to element 1746 via interface 1756. Element 1746 issues an anticipatory acknowledge signal back to the storage controller that issued the write request. Control is then passed to element 1770 via interface 1752. Element 1770 allows the requesting storage controller to perform subsequent write operations. Control is then passed back to element 1734 via interface 1772.

Referring back to element 1746, control also passes to element 1754 via interface 1752. Element 1754 receives an invalidate acknowledge signal from all of the predetermined set of storage controllers. Control is then passed to element 1758 via interface 1760. Element 1758 determines whether each of the invalidate acknowledge signals are asserted by a corresponding one of the storage controllers. If all of the invalidate acknowledge signals are asserted by the predetermined set of storage controllers, control is passed back to element 1734 via interface 1766. If all of the invalidate acknowledge signals are not asserted by the predetermined set of storage controllers, control is passed to element 1762 via interface 1764. Element 1762 issues an error and performs an error recovery routine. Control is then passed back to element 1734 via interface 1766.

Having thus described the preferred embodiments of the present invention, those of skill in the art will readily appreciate that the teachings found herein may be applied to yet other embodiments within the scope of the claims hereto attached.

We claim:

1. In a data processing system having a first storage controller and at least one other storage controller(s) wherein the first storage controller has a first local memory element that may contain a first copy of a data block and wherein each of the at least one other storage controller(s) have a local memory element contained therein that may contain a second copy of the data block, the first storage controller being able to execute a local write instruction to the first local memory element and further having the capability to execute a remote write to the local memory element(s) contained within the at least one other storage controllers(s), the improvement comprising:

a. an XBAR interface block coupled to the first storage controller and further coupled to the at least one other storage controller(s), said XBAR interface block providing an interface between the first storage controller and the at least one other storage controller(s);

b. an invalidate request block coupled to the first storage controller for generating an invalidate request when the first storage controller executes a write instruction;

c. a write request block coupled to the first storage controller for generating a write request when the first storage controller executes a write instruction; and d. delaying means coupled to said XBAR interface block for delaying the transmission of the invalidate request to the at least one other storage controller(s) until said XBAR interface block transmits the write request to a selected one of the at least one other storage controller(s).

2. An improvement according to claim 1 wherein said invalidate request block further generates an invalidate address when the first storage controller executes a write instruction.

3. An improvement according to claim 2 wherein said write request block further generates a write address when the first storage controller executes a write instruction.

4. An improvement according to claim 3 wherein said delaying means does not delay the transmission of the invalidate request when the write instruction is a local write instruction.

5. An improvement according to claim 4 wherein said delaying means does not delay the transmission of the invalidate request when the write request has already been transmitted to the selected one of the at least one other storage controller(s) by the XBAR interface block.

6. An improvement according to claim 5 wherein the at least one other storage controller(s) comprise invalidate means for invalidating the second copy of the data block contained in the local memory element(s) therein when the second copy of the data block matches the invalidate address.

7. An improvement according to claim 6 wherein said invalidate means comprises an invalidate duplicate tag block.

8. An improvement according to claim 7 wherein a at least one first processing element(s) is coupled to said first storage controller; said at least one first processing element(s) initiating the write instruction.

9. An improvement according to claim 8 wherein said at least one first processing element(s) initiating the write instruction by providing a write request and a write address to said write request block and by further providing an invalidate request and invalidate address to said invalidate request block.

10. An improvement according to claim 9 wherein said at least one first processing element(s) comprises an instruction processor.

11. An improvement according to claim 9 wherein said at least one first processing element(s) comprises an input/output element.

12. An improvement according to claim 10 wherein a at least one second processing element(s) is coupled to each of said at least one other storage controller(s); said at least one second processing element(s) accessing said local memory element in a corresponding one of said at least one other storage controller(s).

13. An improvement according to claim 12 wherein said at least one second processing element(s) are prohibited from accessing the second copy of the block of data contained in a corresponding one of the local memory element(s) if the second copy of the block of data has been invalidated by said invalidating means.

14. An improvement according to claim 13 wherein said at least one second processing element(s) comprise an instruction processor.

15. An improvement according to claim 13 wherein said at least one second processing element(s) comprise an input/output element.

16. An improvement according to claim 14 wherein said write request block further comprises a remote out queue wherein said remote out queue services the write requests provided by said at least one first processing element(s) in a predetermined order.

17. An improvement according to claim 16 wherein said invalidate request block further comprises an invalidate out queue wherein said invalidate out queue services the invalidate requests provided by said at least one first processing element(s) in a predetermined order.

18. An improvement according to claim 17 wherein said remote out queue triggers the invalidate out queue thereby ensuring that said write request is processed before said invalidate request.

19. An improvement according to claim 18 wherein said delaying means comprises a remote in queue wherein said remote in queue receives at least one write request from said at least one remote out queue(s) of said at least one first processing element(s) and services the at least one write request(s) in a predetermined order.

20. An improvement according to claim 19 wherein said delaying means further comprises an invalidate in queue wherein said invalidate in queue receives at least one invalidate request from said at least one invalidate out queue(s) of said at least one first processing element(s) and services the at least one invalidate request(s) in a predetermined order.

21. An improvement according to claim 20 wherein said remote in queue triggers the invalidate in queue thereby ensuring that a selected write request is processed before a selected invalidate request.

22. An improvement according to claim 21 further comprising:

a. an invalidate acknowledge block coupled to the at least one other storage controller(s) for providing a corresponding at least one invalidate acknowledge signal(s) in response to said invalidate request; said invalidate acknowledge block providing said at least one invalidate acknowledge signal(s) to said XBAR interface block;

b. providing means coupled to said delaying means for providing an anticipatory acknowledge signal to the first storage controller when said delaying means provides said invalidate request to the at least one other storage controller(s); and c. monitoring means coupled to said XBAR interface block for monitoring said at least one invalidate acknowledge signal(s) from the at least one other storage controller(s); said monitoring means initiating an error algorithm if a predetermined number of said at least one invalidate acknowledge signal(s) are not activated.

23. A data processing apparatus having a first storage controller and at least one other storage controller(s) wherein the first storage controller has a first local memory element that may contain a first copy of a data block and wherein each of the at least one other storage controller(s) have a local memory element contained therein that may contain a second copy of the data block, the first storage controller being able to execute a local write instruction to the first local memory element and further having the capability to execute a remote write instruction to the local memory element(s) contained within the at least one other storage controller(s), comprising:

a. an invalidate request block coupled to the first storage controller for generating a invalidate request when the first storage controller executes a write instruction;

b. a write request block coupled to the first storage controller for generating a write request when the first storage controller executes a write instruction;

c. an XBAR interface block coupled to the first storage controller and further coupled to the at least one other storage controller(s), said XBAR interface block providing an interface between the first storage controller and the at least one other storage controller(s); and d. a delaying element coupled to said XBAR interface block for delaying the transmission of the invalidate request to the at least one other storage controller(s) until said XBAR interface block transmits the write request to the selected one of the at least one other storage controller(s).

24. A data processing apparatus according to claim 23 wherein said invalidate request block further generates an invalidate address when the first storage controller executes a write instruction.

25. A data processing apparatus according to claim 24 wherein said write request block further generates a write address when the first storage controller executes a write instruction.

26. A data processing apparatus according to claim 25 wherein said delaying element does not delay the transmission of the invalidate request when the write instruction is a local write instruction.

27. A data processing apparatus according to claim 26 wherein said delaying element does not delay the transmission of the invalidate request when the write request has already been transmitted to the selected one of the at least one other storage controller(s) by the XBAR interface block.

28. A data processing apparatus according to claim 27 wherein the at least one other storage controller(s) comprise an invalidate element for invalidating the second copy of the data block contained in the local memory element(s) therein when the second copy of the data block matches the invalidate address.

29. A data processing apparatus according to claim 28 wherein said invalidate element comprises an invalidate duplicate tag block.

30. A data processing apparatus according to claim 29 wherein a at least one first processing element(s) is coupled to said first storage controller; said at least one first processing element(s) initiating the write instruction.

31. A data processing apparatus according to claim 30 wherein said at least one first processing element(s) initiating the write instruction by providing a write request and a write address to said write request block and by further providing an invalidate request and invalidate address to said invalidate request block.

32. A data processing apparatus according to claim 31 wherein said at least one first processing element(s) comprises an instruction processor.

33. A data processing apparatus according to claim 32 wherein said at least one first processing element(s) comprises an input/output element.

34. A data processing apparatus according to claim 33 wherein a at least one second processing element(s) is coupled to each of said at least one other storage controller(s); said at least one second processing element(s) accessing said local memory element in a corresponding one of said at least one other storage controller(s).

35. A data processing apparatus according to claim 34 wherein said at least one second processing element(s) are prohibited from accessing the second copy of the block of data contained in a corresponding one of the local memory element(s) if the second copy of the block of data has been invalidated by said invalidating element.

36. A data processing apparatus according to claim 35 wherein said at least one second processing element(s) comprise an instruction processor.

37. A data processing apparatus according to claim 36 wherein said at least one second processing element(s) comprise an input/output element.

38. A data processing apparatus according to claim 37 wherein said write request block further comprises a remote out queue wherein said remote out queue services the write requests provided by said at least one first processing element(s) in a predetermined order.

39. A data processing apparatus according to claim 38 wherein said invalidate request block further comprises an invalidate out queue wherein said invalidate out queue services the invalidate requests provided by said at least one first processing element(s) in a predetermined order.

40. A data processing apparatus according to claim 39 wherein said remote out queue triggers the invalidate out queue thereby ensuring that said write request is processed before said invalidate request.

41. A data processing apparatus according to claim 40 wherein said delaying element comprises a remote in queue wherein said remote in queue receives at least one write request from said at least one remote out queue(s) of said at least one first processing element(s) and services the at least one write request(s) in a predetermined order.

42. A data processing apparatus according to claim 41 wherein said delaying element further comprises an invalidate in queue wherein said invalidate in queue receives at least one invalidate request from said at least one invalidate out queue(s) of said at least one first processing element(s) and services the at least one invalidate request(s) in a predetermined order.

43. A data processing apparatus according to claim 42 wherein said remote in queue triggers the invalidate in queue thereby ensuring that a selected write request is processed before a selected invalidate request.

44. A data processing apparatus according to claim 43 further comprising:

a. an invalidate acknowledge block coupled to the at least one other storage controller(s) for providing a corresponding at least one invalidate acknowledge signal(s) in response to said invalidate request; said invalidate acknowledge block providing said at least one invalidate acknowledge signal(s) to said XBAR interface block;

b. providing element coupled to said delaying element for providing an anticipatory acknowledge signal to the first storage controller when said delaying element provides said invalidate request to the at least one other storage controller(s); and c. monitoring circuit coupled to said XBAR interface block for monitoring said at least one invalidate acknowledge signal(s) from the at least one other storage controller(s); said monitoring element initiating an error algorithm if a predetermined number of said at least one invalidate acknowledge signal(s) are not activated.

45. A method of ensuring data coherency in a data processing system having a first storage controller and at least one other storage controller(s) wherein the first storage controller has a first local memory element that may contain a first copy of a data block and wherein each of the at least one other storage controller(s) have a local memory element contained therein that may contain a second copy of the data block, the first storage controller being able to execute a local write instruction to the first local memory element and further having the capability to execute a remote write instruction to the local memory element(s) contained within the at least one other storage controller(s), comprising:

a. providing a XBAR interface block coupling the first storage controller to the at least one other storage controller(s), the XBAR interface block providing an interface between the first storage controller and the at least one other storage controller(s);

b. providing an invalidate request block coupled to the first storage controller for generating a invalidate request when the first storage controller executes a write instruction;

c. providing a write request block coupled to the first storage controller for generating a write request when the first storage controller executes a write instruction; and d. delaying the transmission of the invalidate request to the at least one other storage controller(s) within the XBAR interface block until the XBAR interface block transmits the write request to a selected one of the at least one other storage controller(s).

46. A method of ensuring data coherency in a data processing system having a first storage controller and at least one other storage controller(s) wherein the first storage controller has a first local memory element that may contain a first copy of a data block and wherein each of the at least one other storage controller(s) have a local memory element contained therein that may contain a second copy of the data block, the first storage controller being able to execute a local write instruction to the first local memory element and further having the capability to execute a remote write instruction to the local memory element(s) contained within the at least one other storage controller(s), comprising the steps of:

a. providing an XBAR interface block coupling the first storage controller to the at least one other storage controller(s), the XBAR interface block providing an interface between the first storage controller and the at least one other storage controller(s);

b. providing an invalidate request block coupled to the first storage controller for generating an invalidate request when the first storage controller executes a write instruction;

c. providing a write request block coupled to the first storage controller for generating a write request when the first storage controller executes a write instruction;

d. providing a write out queue, a write in queue, an invalidate out queue, and an invalidate in queue within the first storage controller and within each of the at least one other storage controller(s);

e. providing a remote write queue and a remote invalidate queue within the XBAR interface block;

f. providing an invalidate duplicate tag block within the first storage controller and the at least one other storage controller(s);

g. waiting for the write request block within the first storage controller to generate a write request;

h. capturing the write request in the write out queue within the first storage controller when step (g) detects the write request;

i. waiting for the write out queue to service the write request captured in step (h);

j. determining if the write request is to a memory within the first storage controller or to a memory within one of the at least one other storage controller(s) thereby determining if the write request is local or remote;

k. routing a corresponding write address and write data to the local memory element within the first storage controller and perform a write therein if step (j) determines that the write request is local;

l. placing an invalidate request into the invalidate out queue;

m. waiting for the invalidate out queue to service the invalidate request;

n. routing an invalidate address to the invalidate duplicate tag block within the first storage controller;

o. determining if there is a match between the invalidate address and the contents of the invalidate duplicate tag block;

p. invalidating the first copy of the data block if a match is found in step (o);

q. performing steps (r)→(zz) if the write request is to a remote storage controller;

r. sending the write request and the corresponding write address to the remote write queue within the XBAR interface block;

s. sending the invalidate request and the corresponding invalidate address to the remote invalidate queue within the XBAR interface block;

t. waiting for the remote write queue to service the write request;

u. allowing the invalidate request to enter the remote invalidate queue when the remote write queue services the write request;

v. routing the write request and the corresponding write address to the write in queue within a selected one of the at least one other storage controller(s);

w. waiting for the remote invalidate queue to service the invalidate request;

x. routing the invalidate request and the corresponding invalidate address to the invalidate in queue within the selected one of the at least one other storage controller(s);

y. waiting for the write in queue to service the write request, and once serviced, route the corresponding write address to the local memory within the selected one of the at least one other storage controller(s) and performing a write thereon;

z. routing the invalidate address to the invalidate duplicate tag block within the selected one of the at least one other storage controllers and determining of there is a match between the invalidate address and the contents of the invalidate duplicate tag block; and zz. invalidating the second copy of the data block if a match is found in step (z).

47. A method according to claim 46 wherein step (u) may further comprise allowing the invalidate request to enter the remote invalidate queue if the write request has already been transmitted to the selected one of the at least one other storage controller(s).

48. A method according to claim 47 wherein step (u) may further comprise allowing the invalidate request to enter the remote invalidate queue if the write instruction is a local write instruction.

49. A data processing system having a first storage controller and at least one other storage controller(s) wherein the first storage controller has a first local memory element that may contain a first copy of a data block and wherein each of the at least one other storage controller(s) have a local memory element contained therein that may contain a second copy of the data block, the first storage controller being able to execute a local write instruction to the first local memory element and further having the capability to execute a remote write instruction to the local memory element(s) contained within the at least one other storage controller(s), comprising:

a. an XBAR interface block coupled to the first storage controller and further coupled to the at least one other storage controller(s), said XBAR interface block providing an interface between the first storage controller and the at least one other storage controller(s);

b. an invalidate request block coupled to the first storage controller for generating an invalidate request when the first storage controller executes a write instruction; said invalidate request block providing said invalidate request to said XBAR interface block;

c. an invalidate acknowledge block coupled to the at least one other storage controller(s) for providing a corresponding at least one invalidate acknowledge signal(s) in response to said invalidate request; said invalidate acknowledge block providing said at least one invalidate acknowledge signal(s) to said XBAR interface block;

d. providing means coupled to said XBAR interface block for providing an anticipatory acknowledge signal to the first storage controller when said XBAR interface block provides said invalidate request to the at least one other storage controller(s); and e. monitoring means coupled to said XBAR interface block for monitoring said at least one invalidate acknowledge signal(s) from said at least one other storage controller(s); said monitoring means initiating an error algorithm if a predetermined number of said at least one invalidate acknowledge signal(s) are not activated.

50. A data processing system according to claim 49 wherein said providing means comprises a providing circuit.

51. A data processing system according to claim 50 wherein said monitoring means comprises a monitoring circuit.

52. A data processing system according to claim 51 where said monitoring circuit comprises an AND function.

53. A method of accelerating the invalidate priority in a data processing system having a first storage controller and at least one other storage controller(s) wherein the first storage controller has a first local memory element that may contain a first copy of a data block and wherein each of the at least one other storage controller(s) have a local memory element contained therein that may contain a second copy of the data block, the first storage controller being able to execute a local write instruction to the first local memory element and further having the capability to execute a remote write instruction to the local memory element(s) contained within the at least one other storage controller(s), comprising:

a. providing an XBAR interface block wherein said XBAR interface block is coupled to the first storage controller and further coupled to the at least one other storage controller(s), said XBAR interface block providing an interface between the first storage controller and the at least one other storage controller(s); said XBAR interface block having an invalidate request queue;

b. providing an invalidate request block coupled to the first storage controller for generating an invalidate request when the first storage controller executes a write instruction;

c. providing an invalidate acknowledge block coupled to the at least one other storage controller(s) for providing a corresponding at least one invalidate acknowledge signal(s) in response to said invalidate request;

d. waiting for the first storage controller to perform a write operation;

e. generating an invalidate request via said invalidate request block when step (d) detects a write operation;

f. providing said invalidate request to said XBAR interface block;

g. placing said invalidate request into the invalidate request queue;

h. issuing an anticipatory acknowledge back to the first storage controller;

i. allowing the first storage controller to perform subsequent write operations upon receiving the anticipatory acknowledge issued in step (h);

j. sending said invalidate request to a predetermined set of the at least one other storage controller(s);

k. receiving an invalidate acknowledge from each of said invalidate acknowledge block(s) of the at least one other storage controller(s);

l. determining if a predetermined number of the invalidate acknowledge signals received in step (k) are activated; and m. issuing an error and performing an error recovery algorithm of step (1) determines that a predetermined number of the invalidate acknowledge signals are not activated.

54. A method according to claim 53 wherein said invalidate request queue comprises a memory element.

55. An apparatus comprising:

a. a first storage controller having a first local memory element wherein the first local memory element may contain a first copy of a data block;

b. a number of other storage controllers, wherein each of said number of other storage controllers include a local memory element that may containing a second copy of the data block;

c. an XBAR interface block coupled to said first storage controller and further coupled to selected ones of said number of other storage controllers, the XBAR interface block providing an interface between said first storage controller and the selected ones of the number of other storage controllers; and d. said first storage controller being capable of providing a remote write instruction to selected ones of said local memory elements of the selected ones of the number of other storage controllers via said XBAR interface block.

56. An apparatus according to claim 55 wherein said first storage controller is further capable of providing an invalidate request, corresponding to selected remote write instructions, to selected ones of the number of other storage controllers via said XBAR interface block.

57. An apparatus according to claim 56 wherein said XBAR interface block delays the transmission of said invalidate request to the selected ones of the number of storage controllers until the remote write instruction reaches the selected ones of the number of other storage controllers.

58. An apparatus according to claim 56 wherein said XBAR interface block provides an anticipatory invalid acknowledge back to said first storage controller when said first storage controller provides said invalid requests to the selected ones of the number of other storage controllers.

59. An apparatus according to claim 58 wherein each of the selected ones of the number of other storage controllers provides an invalidate acknowledge to said XBAR interface block, after receiving an invalidate request from the first storage controller.

60. An apparatus according to claim 59 wherein said XBAR interface block initiates an error recovery algorithm if any of the selected ones of the number of other storage controllers does not provide a predefined invalid acknowledge.

\* \* \* \* \*